US012080090B2

(12) United States Patent
Kakkar et al.

(10) Patent No.: US 12,080,090 B2
(45) Date of Patent: Sep. 3, 2024

(54) COMPUTING SYSTEM FOR DETECTING AND UPDATING STALE INFORMATION

(71) Applicant: Microsoft Technology Licensing, LLC, Redmond, WA (US)

(72) Inventors: Jatin Kakkar, Hyderabad (IN); Beethika Tripathi, Lucknow (IN); Rashi Anand, Hyderabad (IN); Pankaj Khanzode, Hyderabad (IN); Neha Singh, Hyderabad (IN); Daraksha Parveen, Hyderabad (IN); Gangula Rama Rohit Reddy, Hyderabad (IN); Rishabh Malhotra, Ambala (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 439 days.

(21) Appl. No.: 17/552,723

(22) Filed: Dec. 16, 2021

(65) Prior Publication Data
US 2023/0196815 A1    Jun. 22, 2023

(51) Int. Cl.
*G06V 30/416* (2022.01)
*G06F 9/54* (2006.01)
*G06F 40/279* (2020.01)

(52) U.S. Cl.
CPC .......... *G06V 30/416* (2022.01); *G06F 9/542* (2013.01); *G06F 40/279* (2020.01)

(58) Field of Classification Search
CPC ............... G06F 40/30; G06F 16/3344; G06F 16/24575; G06F 16/3329; G06F 40/295;
(Continued)

(56) References Cited

U.S. PATENT DOCUMENTS 10,963,501 B1 *  3/2021  Ramachandrappa ..... G06F 7/32
2007/0162447 A1 *  7/2007  Joshi ...................... G06F 16/951
(Continued)

FOREIGN PATENT DOCUMENTS

WO    2015175338 A1    11/2015

OTHER PUBLICATIONS

Giannis et al., "A Review on Fact Extraction and Verification", Nov. 2021 (Year: 2021).*
(Continued)

*Primary Examiner* — Dung Hong
(74) *Attorney, Agent, or Firm* — CALFEE, HALTER & GRISWOLD LLP

(57) ABSTRACT

A computing system obtains a document that includes text. The computing system identifies a fact referenced in the text of the document, where the fact includes a fact name and a fact value. The computing system determines a topic of the document based upon the text of the document. The computing system identifies a factoid stored in a data store based upon the topic and the fact name, where the factoid includes the fact name and a second fact value, and further where the factoid has been generated based upon second text of a second document. While the document is being displayed to a user, the computing system causes a message to be displayed to the user, where the message prompts the user to accept or reject replacement of the fact value in the document with the second fact value.

20 Claims, 21 Drawing Sheets

(58) Field of Classification Search
CPC ........ G06F 40/10; G06F 40/279; G06F 9/542; G06N 20/00; G06N 3/08; G06V 30/416
See application file for complete search history.

(56) References Cited

U.S. PATENT DOCUMENTS

| | | | |
|---|---|---|---|
| 2012/0005221 A1* | 1/2012 | Ickman | G06F 16/24575 707/769 |
| 2013/0198196 A1* | 8/2013 | Myslinski | G06Q 30/02 707/758 |
| 2015/0324413 A1* | 11/2015 | Gubin | G06F 40/166 715/703 |
| 2019/0220544 A1* | 7/2019 | Khanna | G06F 16/9558 |
| 2020/0175032 A1* | 6/2020 | Gibson | G06F 16/258 |
| 2022/0300716 A1* | 9/2022 | Sabharwal | G06F 16/24578 |

OTHER PUBLICATIONS

"International Search Report and Written Opinion Issued in PCT Application No. PCT/US22/044655", Mailed Date: Jan. 13, 2023, 10 Pages.

\* cited by examiner

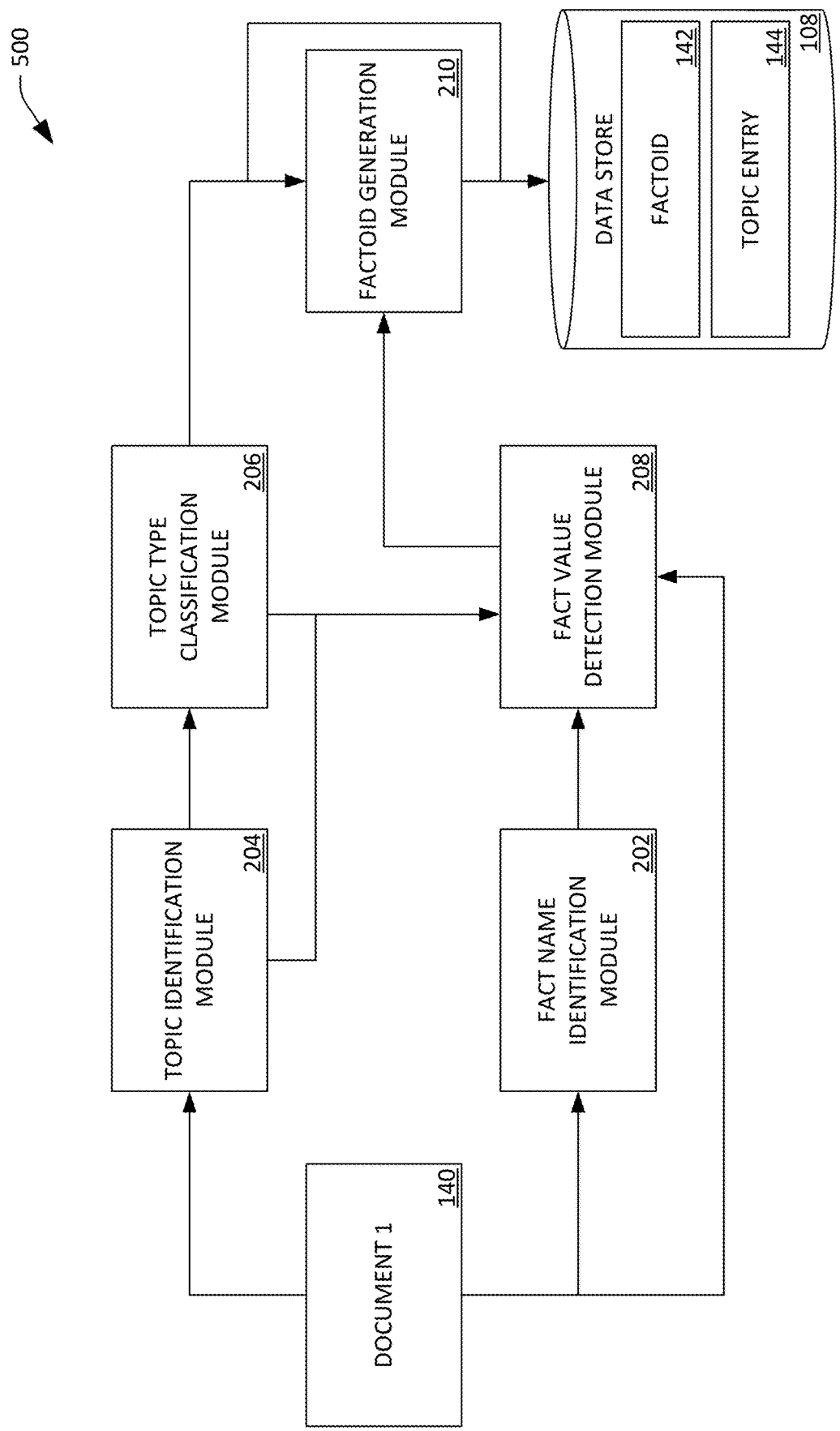

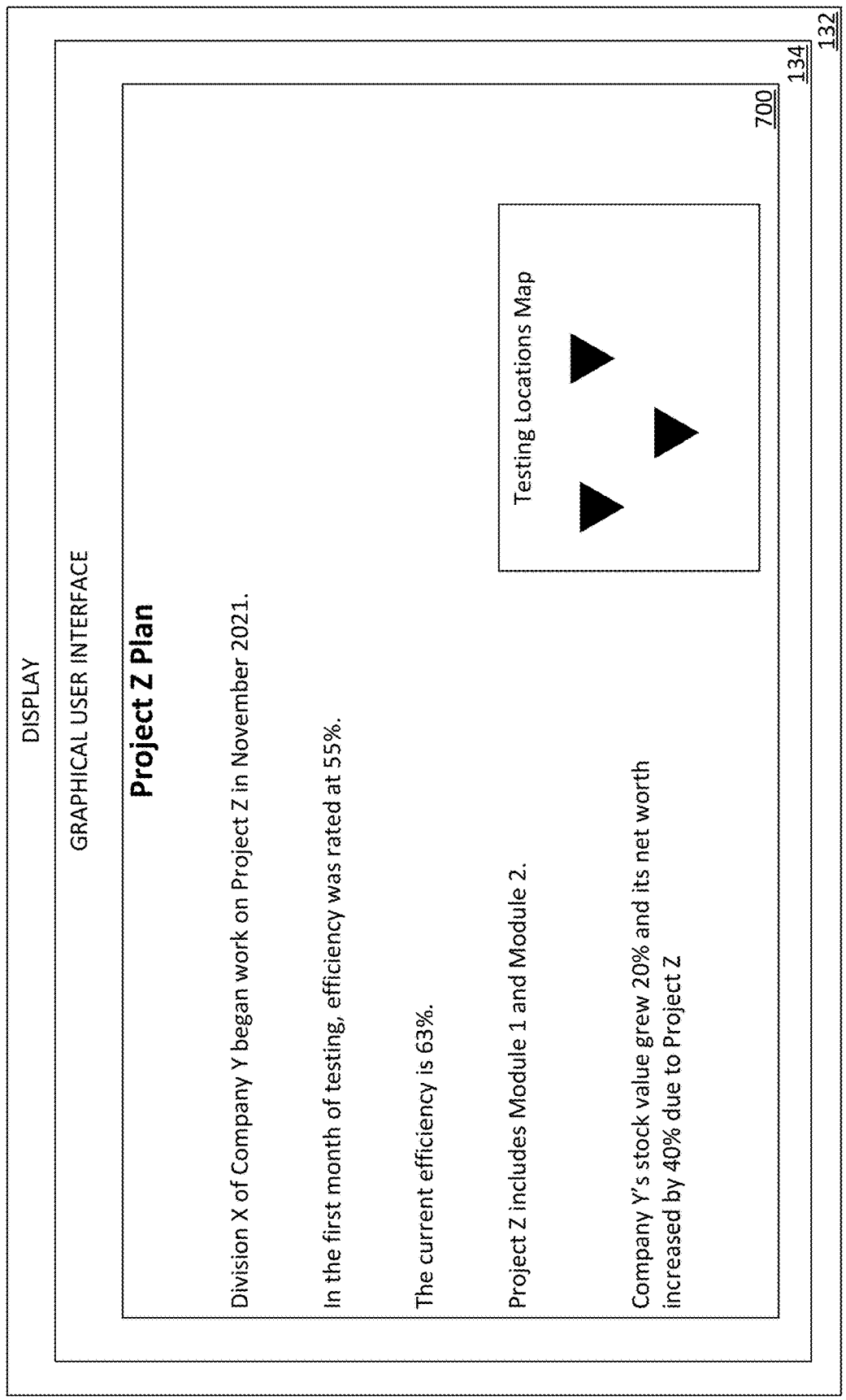

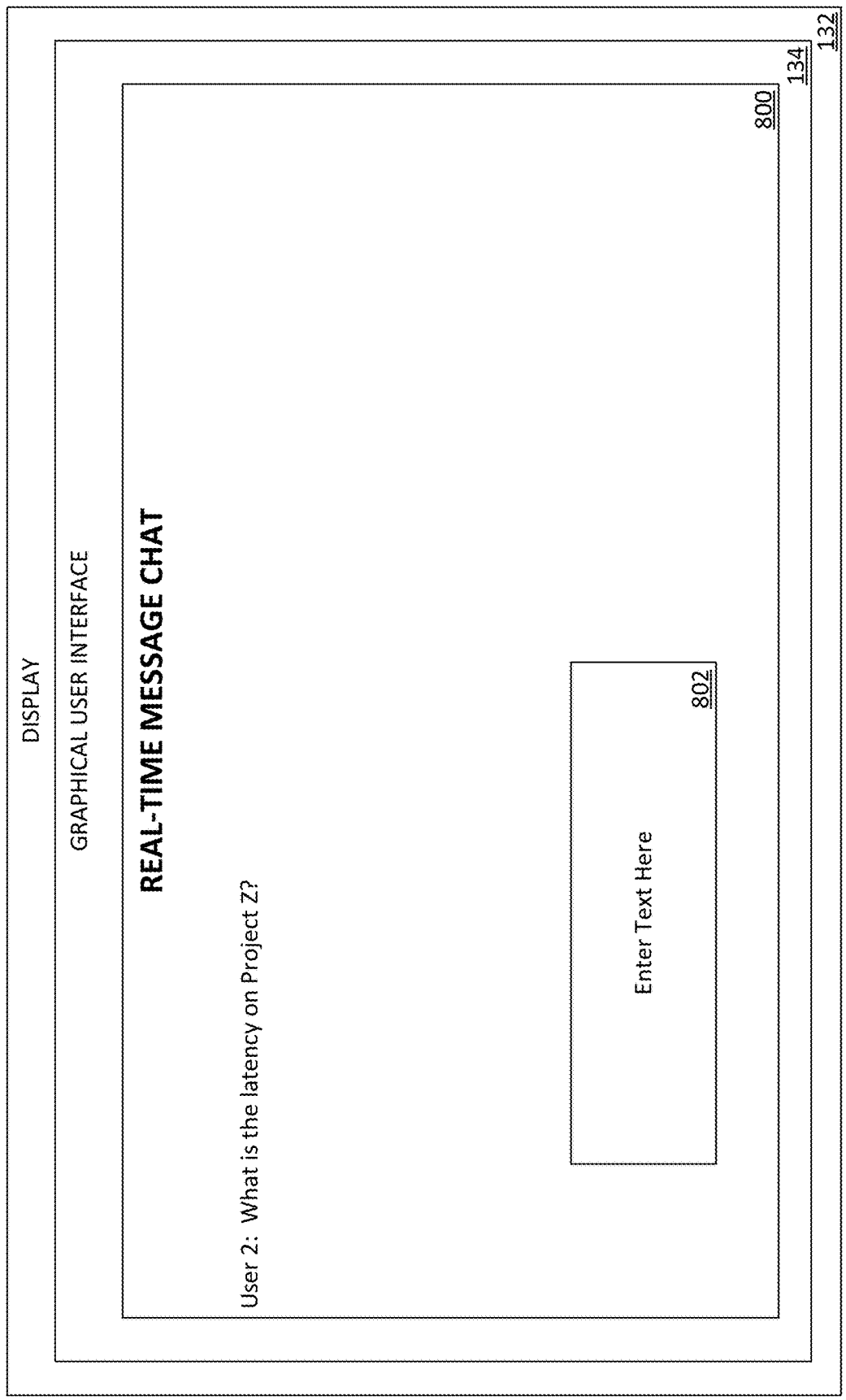

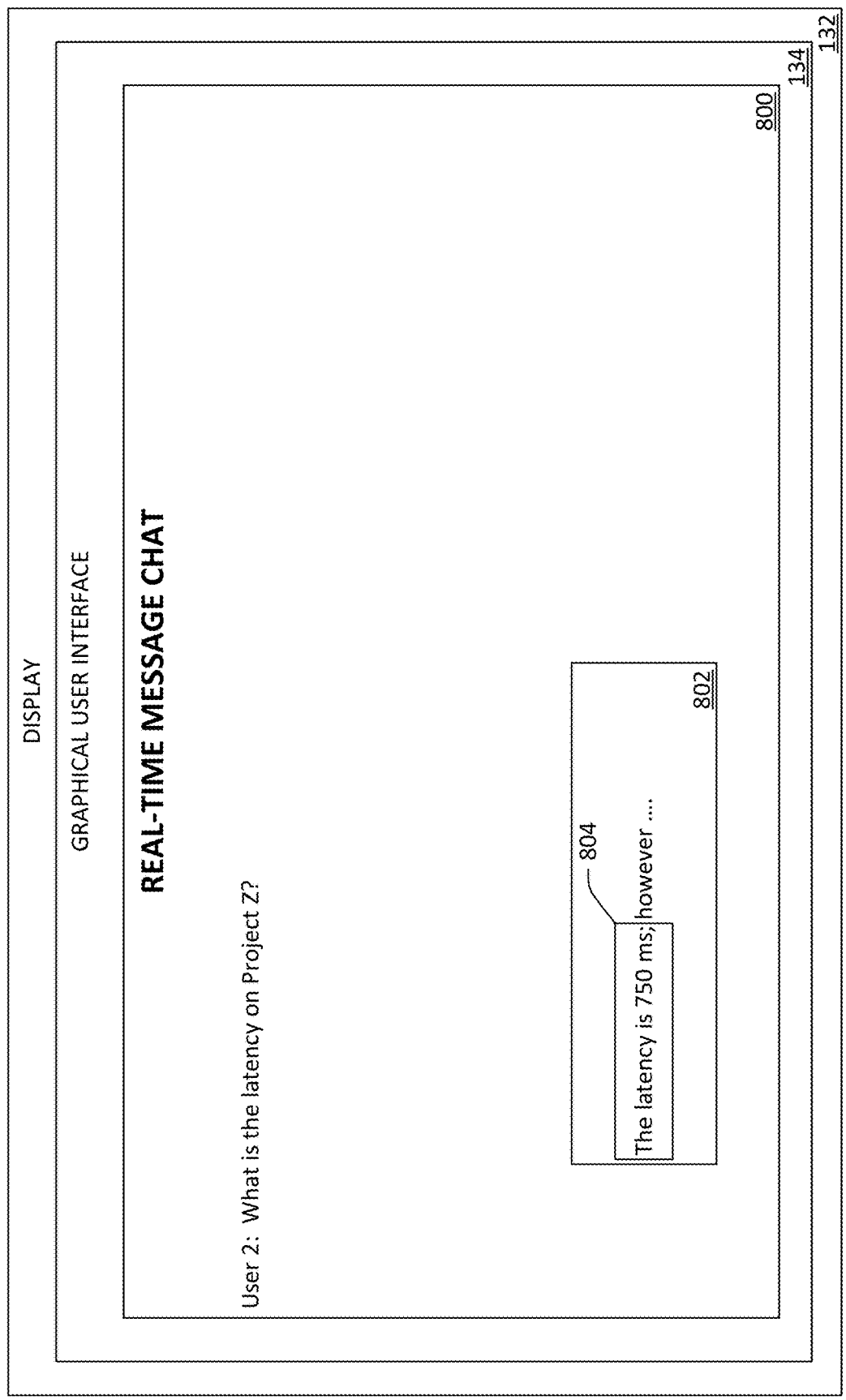

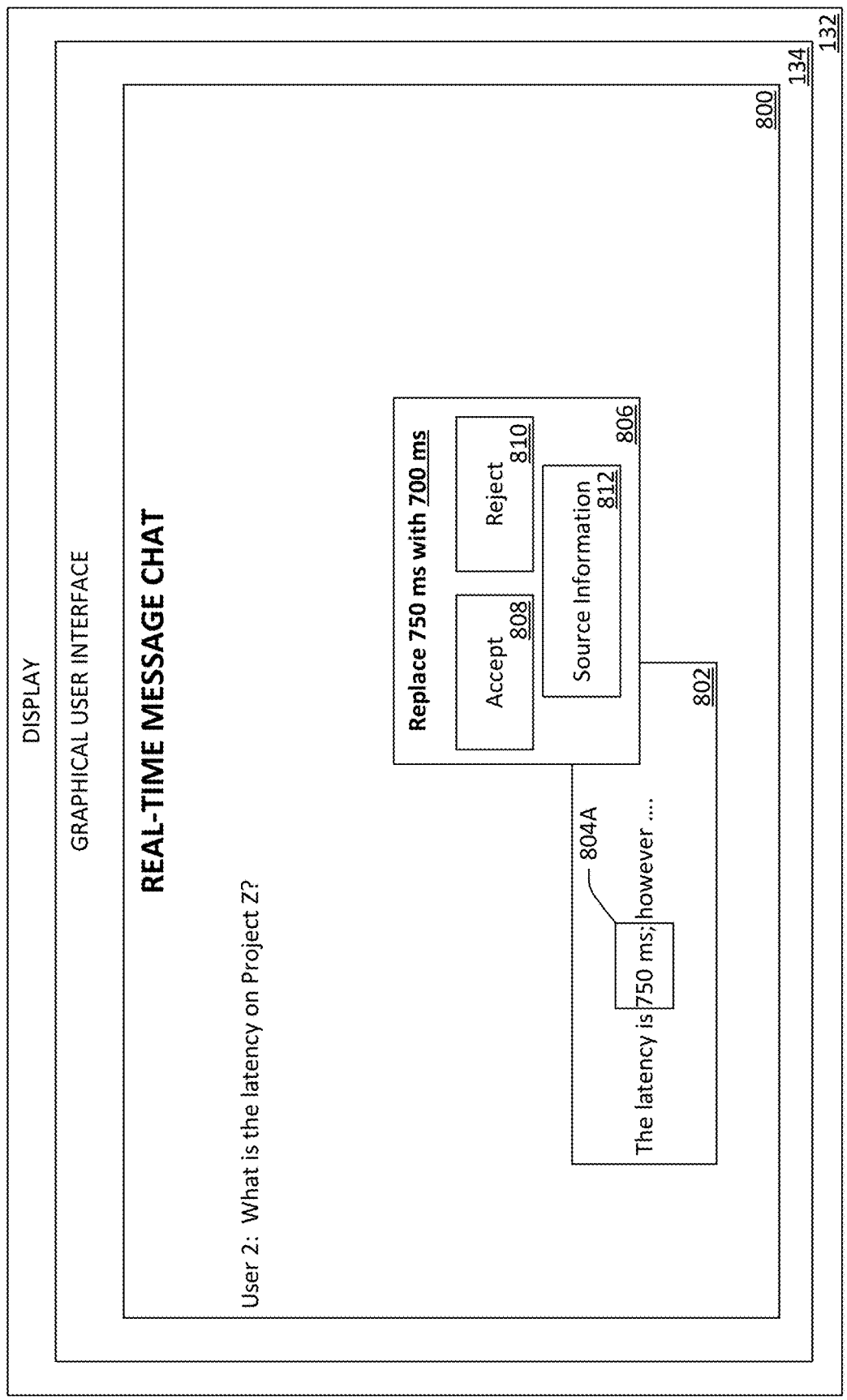

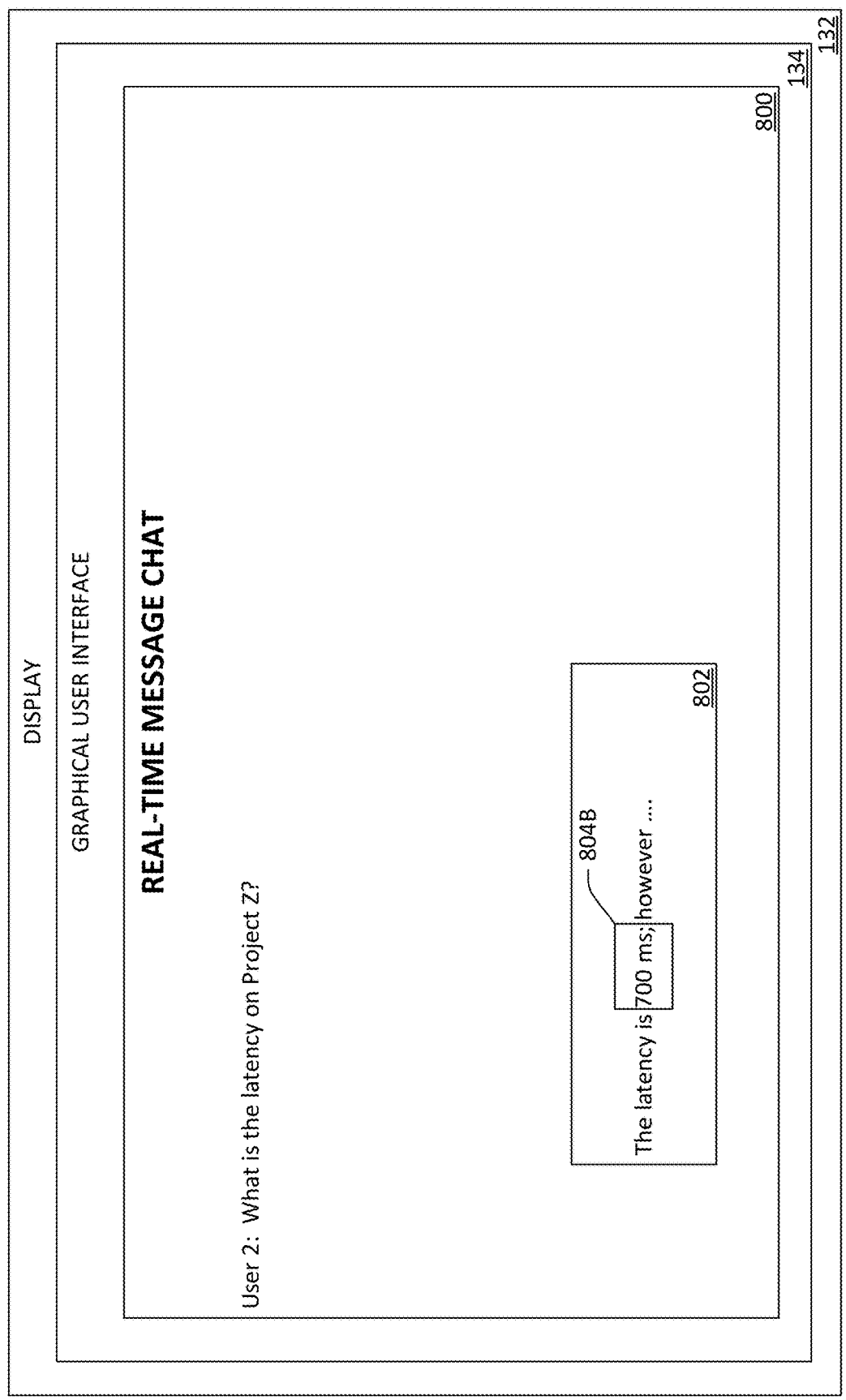

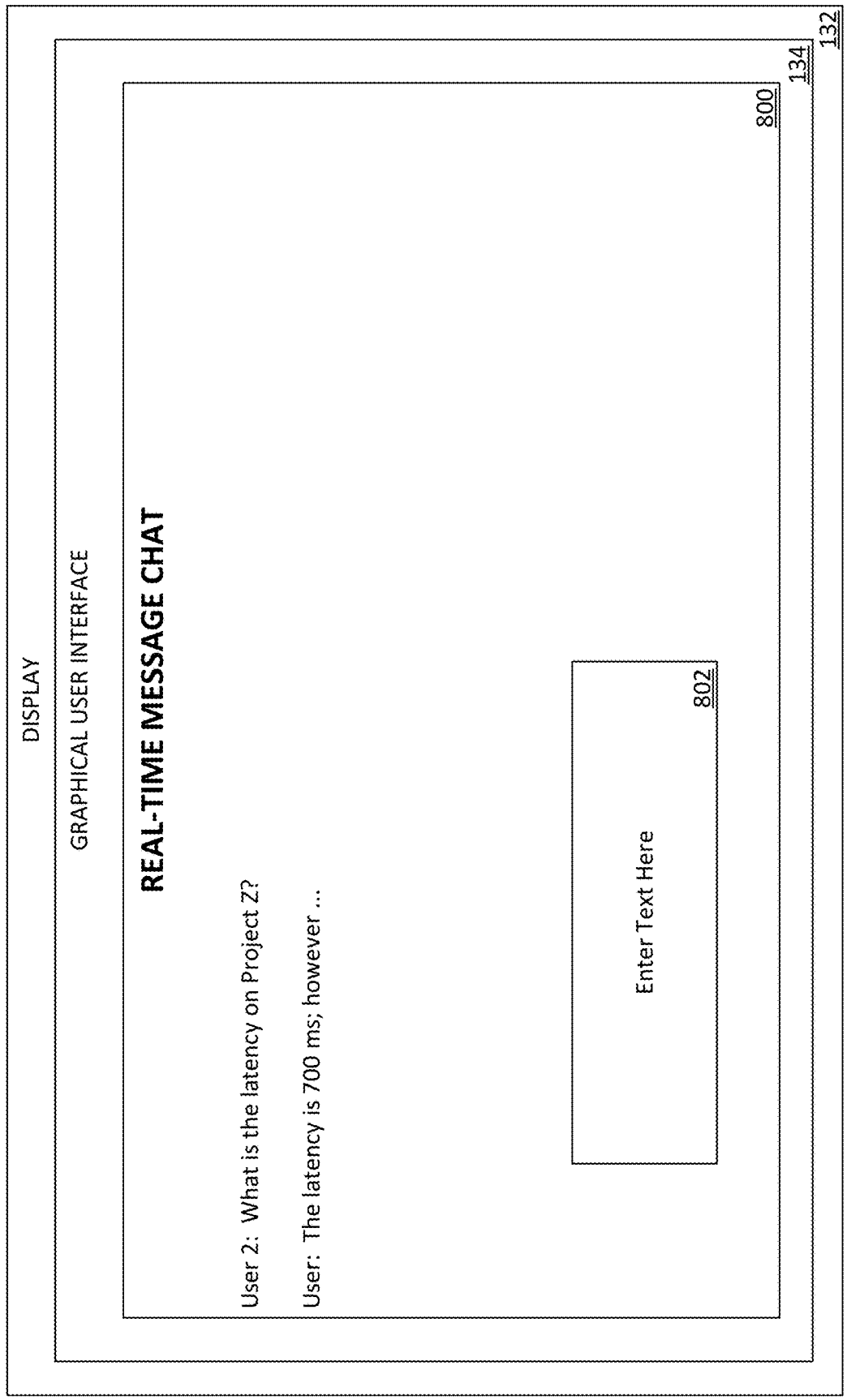

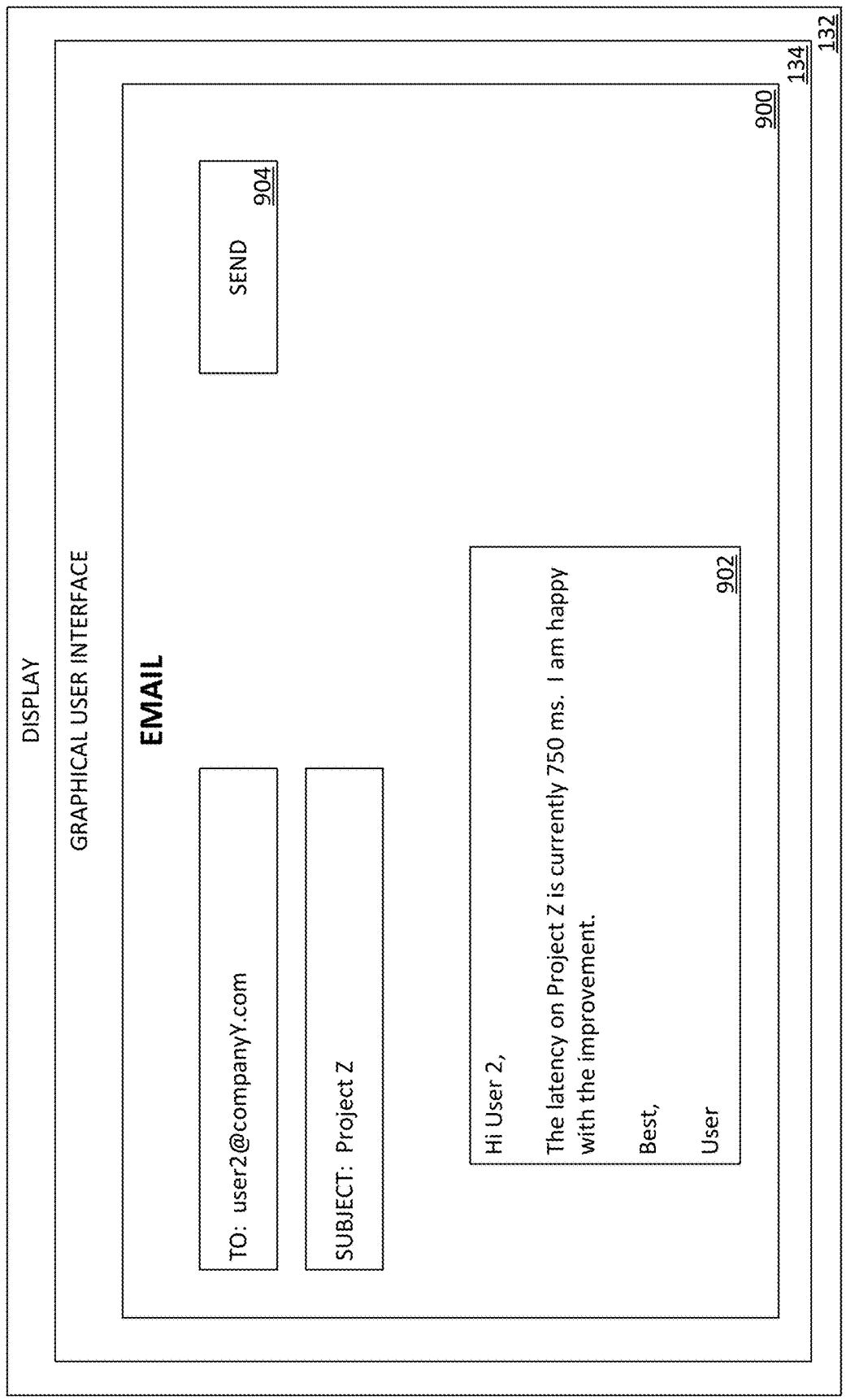

COMPUTING SYSTEM FOR DETECTING AND UPDATING STALE INFORMATION

BACKGROUND

Computer-readable documents (e.g., word processing documents, spreadsheets, slideshows, emails, reports generated by a reporting system, etc.) are created, modified, and/or displayed on computing systems operated by enterprise workers as part of their duties. These documents often reference facts where a fact referenced in a document can be represented as a fact name and a fact value. In an example, a computer-readable document includes the sentence "Company Y is a global company with 177 offices." In the example, the fact name is "the number of offices of Company Y" and the fact value is "177."

References to facts in computer-readable documents often become outdated over time as an enterprise grows and changes. In an example, sometime after creation of the document described above, "Company Y" may grow to have "200" offices instead of "177," and thus the fact referenced in the document is outdated. Conventionally, users are tasked with updating the document to reflect current information. This requires a user to manually review the document for facts referenced in the document that may be outdated. A computing device operated by the user then receives manual input from the user in order for the computing device to search for current fact values located in other documents. However, the user may not know where to search for the current fact values, as the current fact values may have been input by other users in the other documents. This often leads to the computing device performing redundant searches over different storage locations, which is computationally burdensome. Furthermore, the searches may surface a large number of search result documents, some of which may be unrelated to the user's intent: "Company Y Office count." The process of manually searching through each of the search result documents is cumbersome, prone to error, and burdensome on the limited time that is available to the user. Alternatively, some current fact values may be stored in a database, such as a relational database. However, many users do not possess sufficient knowledge of database query languages and as such the database cannot be effectively queried to ascertain the current fact values.

SUMMARY

The following is a brief summary of subject matter that is described in greater detail herein. This summary is not intended to be limiting as to the scope of the claims.

Various technologies pertaining to detecting and updating stale information in computer-readable content are described herein. The technologies described herein are able to automatically identify factual information that is outdated based upon text of a document and a topic of the document, where the document may be a word processing document, a spreadsheet, a slideshow, an email, or a real-time message. The technologies described herein prompt a user to replace a fact value for an outdated fact with an updated (e.g., current) fact value, where the updated fact value is obtained from a factoid stored in computer-readable storage, and where the factoid is generated based upon text of a second document.

In example operation, a computing system obtains a first document comprising first text. In an example, the first text includes the sentence: "Company Y has a revenue of $140 billion." The computing system identifies a fact referenced in the first document, where the fact includes a fact name and a first fact value, and further where the fact name and the first fact value are identified using a natural language processing (NLP) algorithm. The first fact value include one or more numbers, one or more words, non-textual data such images, or combinations thereof. Following the example, the fact name is "Company Y revenue" and the first fact value is "$140 billion." The computing system determines a topic of the first document based upon the first text of the first document using a deep learning model (or another suitable model that assigns topics to documents). Following the example, the topic of the first document is "Company Y." The computing system determines a classification of the topic based upon the topic and the first text. Following the example, the classification of the topic is "organization." The computing system generates a factoid, where factoid includes the fact name, the first fact value, and (optionally) an identifier for the topic. The factoid also optionally includes metadata, such as a date of creation of the first fact value, an identity of a person who authored and/or modified the first document, etc. The computing system also generates a topic entry, where the topic entry includes the identifier for the topic, the classification of the topic, and an identifier for the first document. The factoid and the topic entry may include respective links to one another. Alternatively, the links may be external to the factoid and the topic entry. The computing system stores the factoid and the topic entry in a data store.

Subsequently, the computing system obtains a second document that includes second text. In an example, the second document was created prior to creation of the first document, and as such, the second document includes outdated information. For instance, the second text includes the sentence: "Company Y has a revenue of $100 billion," which is outdated. In another example, the second document is obtained when the second document is opened on a computing device operated by a user. In yet another example, the second document is an email or a real-time message that is being authored by the user. The computing system identifies the fact name and a second fact value referenced in the second document using the NLP algorithm. Following the example given above, the fact name is "Company Y" and the second fact value is "$100 billion." The computing system also determines a topic of the second document using the deep learning model and/or determines a classification of the topic of the second document as described above. The computing system identifies the factoid in the data store based upon the fact name in the second document and at least one of the topic or the classification of the topic. It is to be understood that the computing system may identify more than one factoid in the data store. As such, the computing system may filter factoids from consideration based upon execution of heuristic based rules (or a deep learning model) and/or rank identified factoids based upon ranking criteria.

While the second document is being displayed to the user, the computing system causes a message to be displayed to the user, where the message prompts the user to accept or reject replacement of the second fact value in the second document with the first fact value from the factoid. The message may also include information about the source of the first fact value, such as a datetime on which the first fact value was generated, an identifier for the first document, an identifier for the person that created and/or last modified the first document, etc. When the computing system receives an indication that the user accepts the replacement of the second fact value with the first fact value, the computing system causes the second fact value to be replaced with the first fact value such that the second document displays the first fact value in place of the second fact value. Following the example given above, the computing system replaces "Company Y has a revenue of $100 billion" in the second document with "Company Y has a revenue of $140 billion."

The above-described technologies present various advantages over conventional technologies. First, the above-described technologies do not require users to have knowledge about databases or database-related queries. Second, the above-described technologies are able to identify stale information in a document in real-time while the document is being displayed to the user, regardless of whether the document is a word processing document, an email, or a real-time message. Third, vis-à-vis the deep learning model, the above-described technologies are better able to identify a topic (or topics) of a document, which aids in accurately identifying factoids that include current fact values for outdated facts in the document. For instance, the above-described technologies can identify different topics of different sections of a document, and replace fact values for outdated facts in each of the different sections with updated (e.g., current) fact values.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 5 illustrates an example off-line process flow performed by a fact application that facilitates detecting and updating stale information.

FIGS. 7A-D illustrate example views of a document graphical user interface (GUI) that facilitates detecting and updating stale information.

FIGS. 8A-E illustrate example views of an real-time messaging GUI that facilitates detecting and updating stale information.

FIGS. 9A-D illustrate example views of an email GUI that facilitates detecting and updating stale information.

Figure 1:
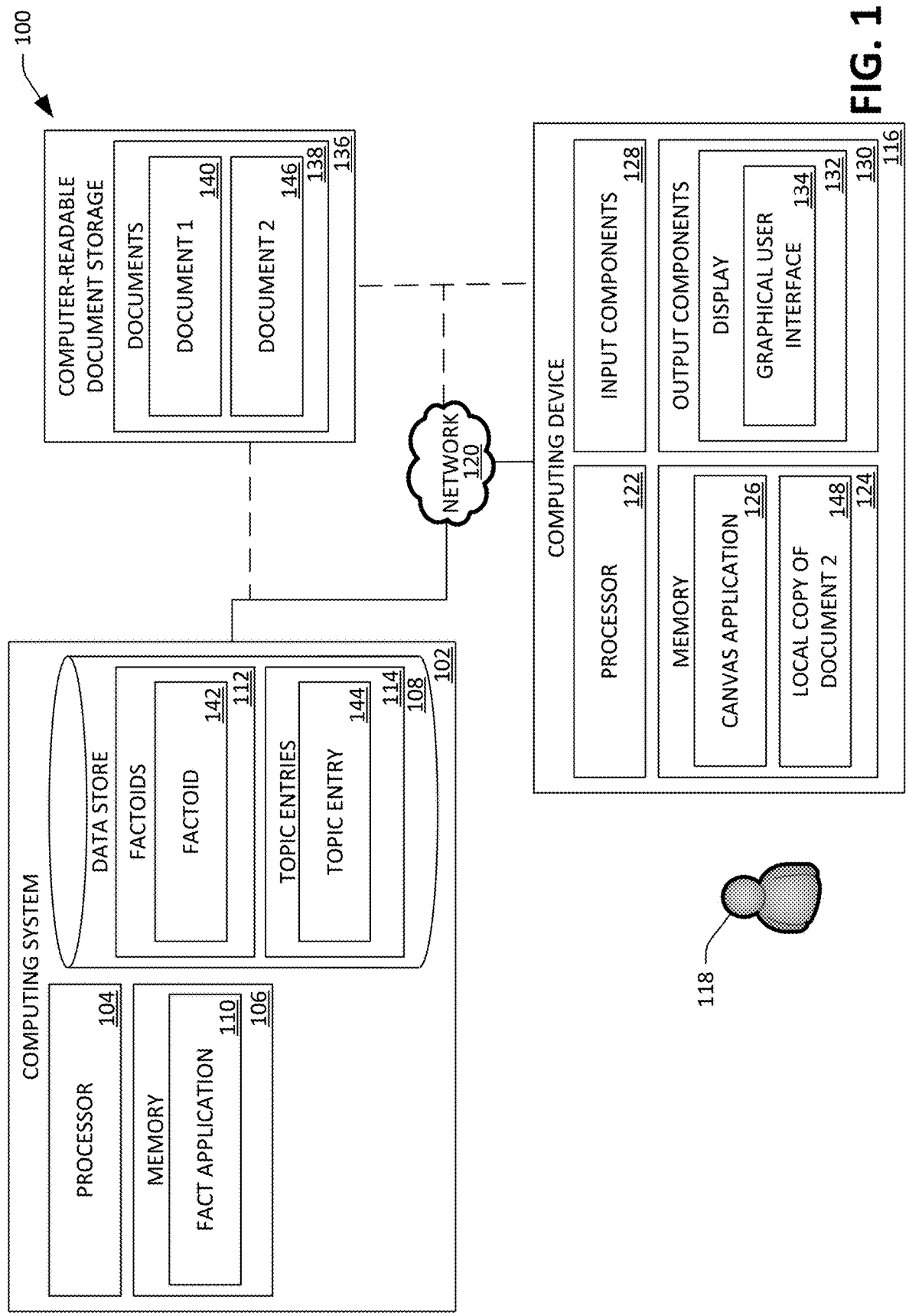
FIG. 1 is a functional block diagram of an example computing environment that facilitates detecting and updating stale information.

Various technologies pertaining to detecting and updating stale information are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

DETAILED DESCRIPTION

As discussed above, facts in computer-readable documents may become outdated over time. Conventionally, a computing device operated by a user performs many searches over different storage locations in order to discover a current fact value for an outdated fact. This is computationally burdensome and frustrating from a user experience perspective. To address these issues, a computing system is described herein that is configured to automatically identify outdated facts in a document, where the document may be a word processing document, a spreadsheet, a slideshow, an email, or a real-time message. The computing system described herein prompts a user to replace a fact value for the outdated fact with an updated fact value (e.g., a current fact value), where the updated fact value is obtained from a factoid stored in computer-readable storage, and where the factoid is generated based upon a second document.

In example operation, a computing system obtains a first document comprising first text. In an example, the first text includes the sentence: "Project Z includes Module 1, Module 2, and Module 3." The computing system identifies a fact referenced in the first document, where the fact includes a fact name and a first fact value, and further where the fact name and the first fact value are identified using a natural language processing (NLP) algorithm. The first fact value includes one or more numbers, one or more words, non-textual data such an image, or combinations thereof. Following the example, the fact name is "Project Z modules" and the first fact value is "Module 1, Module 2, and Module 3." The computing system determines a topic of the first document based upon the first text of the first document using a deep learning model (or another suitable model that assigns topics to documents). Following the example, the topic of the first document is "Project Z." The computing system determines a classification of the topic based upon the topic and the first text. Following the example, the classification of the topic is "project." The computing system generates a factoid, where factoid includes the fact name, the first fact value, and (optionally) an identifier for the topic. The factoid may also include a type of the fact. The factoid also optionally includes metadata, such as a date of creation of the first fact value, an identity of a person who authored or last modified the first document, etc. The computing system also generates a topic entry, where the topic entry includes the identifier for the topic, the classification of the topic, and an identifier for the first document. The factoid and the topic entry include respective links to one another.

Alternatively, the links may be external to the factoid and the topic entry. The computing system stores the factoid and the topic entry in a data store.

Subsequently, the computing system obtains a second document that includes second text. In an example, the second document was created prior to creation of the first document, and as such, the second document includes outdated information. For instance, the second text includes the sentence: "Project Z includes Module 1 and Module 2," which is outdated. In another example, the second document is obtained when the second document is opened on a computing device operated by a user. In yet another example, the second document is an email or a real-time message that is being authored by the user. The computing system identifies the fact name and a second fact value referenced in the second document using the (NLP) algorithm. Following the example given above, the fact name is "Project Z" and the second fact value is "Module 1 and Module 2." The computing system also determines a topic of the second document using the deep learning model and/or determines a classification of the topic of the second document as described above. The computing system identifies the factoid in the data store based upon the fact name in the second document and at least one of the topic or the classification of the topic. It is to be understood that the computing system may identify more than one factoid. As such, the computing system may filter factoids from consideration based upon execution of heuristic based rules and/or rank identified factoids based upon ranking criteria.

While the second document is being displayed to the user, the computing system causes a message to be displayed to the user, where the message prompts the user to accept or reject replacement of the second fact value in the second document with the first fact value from the factoid. The message may also include information about the source of the first fact value, such as a datetime on which the first fact value was generated and/or last modified, an identifier for the first document, an identifier for the person that created and/or last modified the first document, etc. When the computing system receives an indication that the user accepts the replacement of the second fact value with the first fact value, the computing system causes the second fact value to be replaced with the first fact value such that the second document displays the first fact value in place of the second fact value. Following the example given above, the computing system replaces "Project Z includes Module 1 and Module 2" in the second document with "Project Z includes Module 1, Module 2, and Module 3."

The above-described technologies present various advantages over conventional technologies. First, the above-described technologies do not require users to have knowledge about databases or database-related queries. Second, the above-described technologies are able to identify stale information in a document in real-time while the document is being displayed to the user, regardless of whether the document is a word processing document, an email, or a real-time message. Third, vis-à-vis the deep learning model, the above-described technologies are better able to identify a topic of a document, which aids in accurately identifying factoids that include current fact values for outdated facts in the document.

With reference to FIG. 1, an example computing environment 100 that facilitates detecting and updating stale information is illustrated. The computing environment 100 includes a computing system 102. According to embodiments, the computing system 102 is a server computing device. According to some embodiments, the computing system 102 is a cloud-based computing platform. The cloud computing system 102 includes a processor 104, memory 106, and a data store 108.

The memory 106 has a fact application 110 loaded therein. As will be explained in greater detail below, the fact application 110, when executed by the processor 104, is configured to, inter alia, detect stale facts in computer-readable documents and update the stale facts with current facts. According to embodiments, the facts are related to and included in documents of an enterprise. In general, a fact includes a fact name and a fact value, where the fact value may be or include number(s), word(s), other data, such as one or more images, or combinations thereof. Facts include atomic facts, subjective facts, interlinked facts, non-textual facts, universal facts, and time-linked facts.

An atomic fact is related to single-valued (or multiple-valued) information. An atomic fact includes a fact name and a fact value, where the fact value is numerical data or textual data that is likely to change over time. In an example, the fact name for an atomic fact is "Employee count of Company Y" and the fact value is "100." In another example, the fact name for an atomic fact is "President of Company Y" and the fact value is "John Doe."

A subjective fact refers to processes that are descriptive in nature. Subjective facts may be groups of lines which, when combined, represent a single concept. Subjective facts may evolve over time. In an example, a subjective fact includes components in a pipeline for a product that evolves with time. The pipeline can change even when input and output to the pipeline are the same, but the overall pipeline changes over time due to changing components.

An interlinked fact refers to facts that have dependence on one another. For instance, an interlinked fact includes a first fact (which includes a first fact name and a first fact value value) and a second fact (which includes a second fact name and a second fact value). When the first fact value is changed, the second fact value is also changed. In an example, an interlinked fact is growth in stock value of "Company Y" and net worth of "Company Y." Both the growth in stock value and the net worth of the company need to be updated in sync.

A non-textual fact includes visual information which is shown in images. In an example, a non-textual fact includes map markers on a map of a country, where the map markers correspond to office locations of "Company Y."

A universal fact is a fact that should not be updated. In an example, a universal fact includes a fact name of "Company Y was founded in" and a fact value of "2000." As the founding date of "Company Y" will never change, the fact application 110 does not update universal facts.

A time-linked fact is a fact that should not be updated based upon a context in which the time-linked fact occurs. In an example, a time-linked fact may occur in a release document for a product release. Facts in the release document are tied to the release and should not be updated. In another example, a paragraph in a document may refer to an earlier version of the product. Facts in the paragraph should not be changed, as the intention of the paragraph is to describe the earlier version of the product. In yet another example, a fact that is explicitly tied to a date should not be updated, such as "Number of Users Assisted in December 2020-5.1 million." The fact application 110 does not update time-linked facts.

Figure 2:
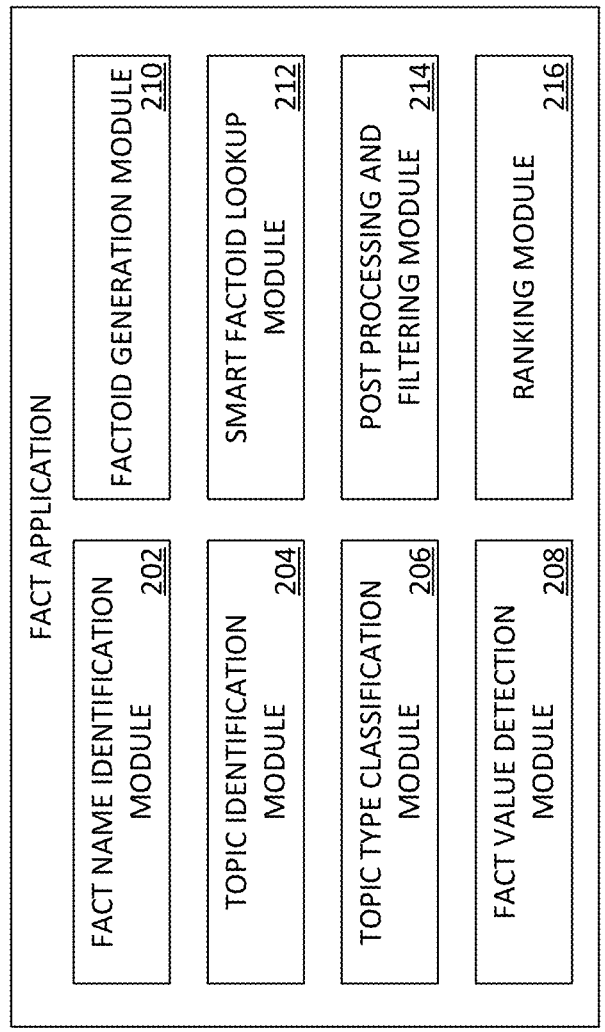
FIG. 2 is a functional block diagram of an example fact application.

Turning now to FIG. 2, example modules of the fact application 110 are illustrated. The fact application 110 includes a fact name identification module 202. The fact name identification module 202 is configured to identify a fact name referenced in a computer-readable document (e.g., within text of the computer-readable document). In an example, a fact name is "Number of employees of Company Y." The fact name identification module 202 may be or include natural language processing (NLP) algorithms and/or NLP machine learning models that identify fact names in the computer-readable document. It is to be understood that the fact name identification module 202 can identify a fact name referenced in the text, even when the fact name is not explicitly included word for word in the text. In an example, text of a document includes the sentence "Company Y has 100 employees". In the example, the fact name identification module 202 determines identifies a fact name of "Number of employees of Company Y" from the sentence using the NLP algorithms and/or the NLP machine learning models. According to embodiments, the fact name identification module 202 is configured to identify a type of a fact (e.g., atomic, subjective, universal, etc.). According to other embodiments, a separate module (not depicted in FIG. 2) that is part of the fact application 110 is configured to identify the type of the fact.

The fact application 110 includes a topic identification module 204. The topic identification module 204 is configured to determine a topic of a document based upon text of the document. In an example where a document relates to "Project Z," the topic identification module 204 determines that the topic of the document is "Project Z" based upon the text of the document. The topic identification module 204 may additionally determine the topic of the document based upon metadata for the document, such as an author of the document, a datetime on which the document was created, etc. The topic identification module 204 may be or include a deep learning model, such as Turing model, that determines a topic of the document.

The fact application 110 includes a topic type classification module 206. The topic type classification module 206 is configured to determine a classification of a topic of a document based upon text of the document and the topic of the document (determined via the topic identification module 204). The topic type classification module 206 may also determine the classification of the topic of the document based upon metadata for the document. The topic type classification module 206 may classify the topic of the document into one or more of a plurality of predefined classes. In an example, the plurality of predefined classes include "project," "product," "team," and, "organization." Following the example above where the document is about "Project Z," the topic type classification module 206 classifies the topic, "Project Z", as a "project." The topic type classification module 206 may be or include a deep learning model that classifies the topic of the document into one or more of the plurality of pre-defined classes.

The fact application 110 includes a fact value detection module 208. The fact value detection module 208 is configured to identify a fact value for a fact name identified by the fact name identification module 202 using NLP algorithms, NLP machine learning models, and/or heuristic based models. It is to be understood that the fact value detection module 208 may identify a plurality of fact values for the fact name. In an example, a document includes the following text: "Company Y has 100 employees." As discussed above, the fact name identification module 202 identifies "Number of Employees of Company Y" as the fact name. The fact value detection module 208 identifies a corresponding fact value for the "Number of Employees of Company Y" fact name: "100."

It is to be understood that the fact name identification module 202 and the fact value detection module 208 can identify fact values corresponding to fact names, even when the fact values and their corresponding fact names are located at different portions within a document (e.g., different sentences, different paragraphs, etc.). It is also to be understood that a fact value may be or include number(s), word(s), non-textual data (such as one or more images), or combinations thereof. In an example, a document includes the following passage: "Company Y is rapidly growing. It currently has 100 employees." In the example, the fact name identification module 202 identifies "Number of Employees of Company Y" as the fact name and the fact value detection module identifies "100" as the fact value by determining that "It" refers to "Company Y."

It is also to be understood that the fact application 110, via the fact name identification module 202 and the fact value detection module 208, may be configured to identify facts as atomic facts, subjective facts, interlinked facts, non-textual facts, universal facts, or time-linked facts. When the fact application 110 identifies a fact as a universal fact or a time-linked fact, the fact application 110 does not proceed with replacement of a fact value of the universal fact or the time-linked fact with another fact value. When the fact application 110 identifies a fact as an atomic fact, a subjective fact, an interlinked fact, or a non-textual fact, the fact application 110 may proceed with replacement of a fact value of the atomic fact, the subjective fact, the interlinked fact, or the non-textual fact with another fact value.

The fact application 110 includes a factoid generation module 210. The factoid generation module 210 is configured to generate a factoid for a document based upon a fact name referenced in the document (identified by the fact name identification module 202), a fact value referenced in the document (identified by the fact value detection module 208), and a topic of the document (determined by the topic identification module 204). The factoid generation module 210 is also configured to generate a topic entry (described in greater detail below). Furthermore, the factoid generation module 210 is configured to store the factoid and the topic entry in the data store 108.

Figure 3:
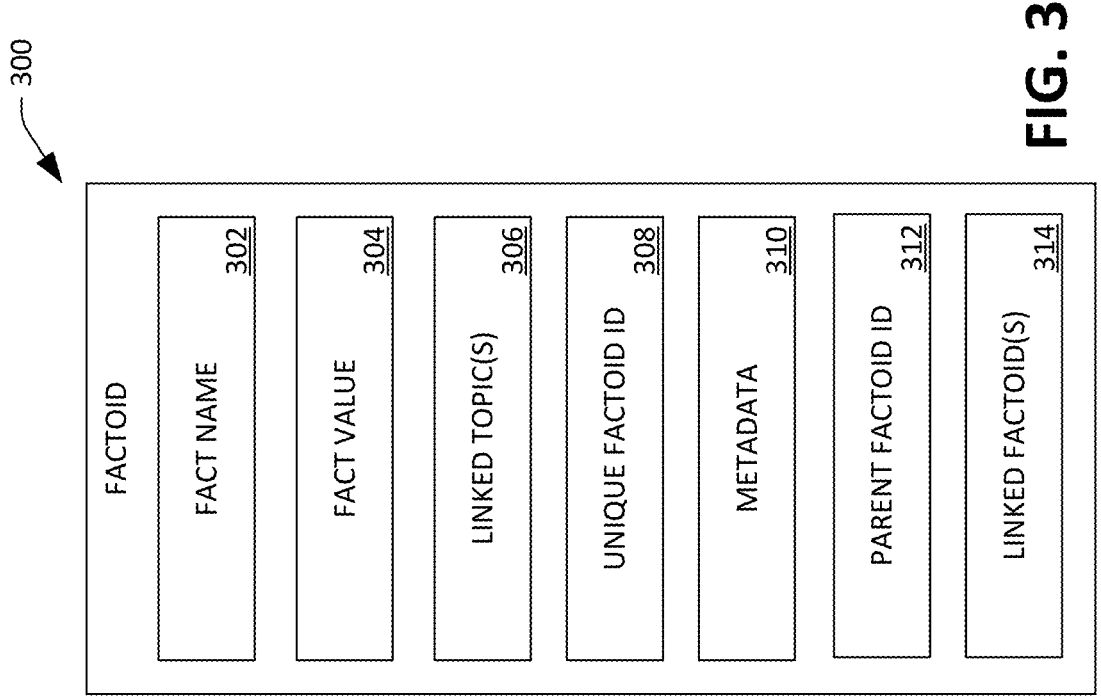
FIG. 3 is a functional block diagram of an example factoid stored in computer-readable storage.

Turning now to FIG. 3, an example factoid 300 that is generated by the factoid generation module 210 in accordance with a factoid schema is illustrated. The factoid 300 includes a fact name 302, where the fact name is identified by the fact name identification module 202. The factoid 300 also includes a fact value 304, where the fact value 304 is identified by the fact value detection module 208. It is to be understood that the factoid 300 may include a plurality of fact values. The factoid 300 may further include an identifier for a topic 306 to which the factoid 300 is linked, where the identifier for the topic 306 has been determined via the topic identification module 204. It is to be understood that the factoid 300 may be linked to more than one topic. Alternatively, the identifier for the topic 306 may be stored external to the factoid 300 (e.g., separately in the data store 108). According to embodiments, the identifier for the topic 306 may be replaced with a unique identifier for the topic. The factoid 300 may include a unique factoid identifier 308 that uniquely identifies the factoid 300. The unique factoid identifier 308 helps to prevent the creation of duplicative factoids (explained in greater below). In an example, the fact name 302 of the factoid 300 is "Number of Employees of Company Y," the fact value 304 is "100," the identifier(s) for the topic(s) 306 include "Company Y" and "Project Z," and the unique factoid identifier 308 is "abc1234".

According to embodiments, the factoid 300 includes metadata 310 for a fact that is included in the factoid 300. The metadata 310 may include a date of creation of the factoid 300, an identifier for a user that caused creation of the factoid 300, one or more identifiers for users that updated the fact value 304, datetimes (dates and corresponding times on the dates) on which the fact value 304 was updated, information about the user and/or the users (e.g., job titles), etc.

According to embodiments, facts are hierarchical. According to the embodiments, the factoid 300 includes an identifier for a parent factoid 312 of the factoid 300.

According to embodiments, the factoid 300 is linked to related factoids. According to the embodiments, the factoid 300 includes an identifier (or identifiers) to a related factoid (or related factoids) 314.

Figure 4:
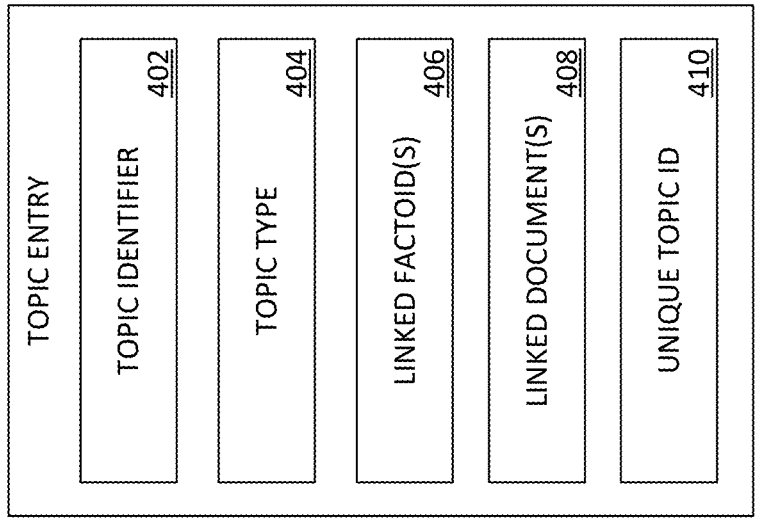
FIG. 4 is a functional block diagram of an example topic entry stored in computer-readable storage.

Referring now to FIG. 4, an example topic entry 400 that is generated by the factoid generation module 210 in accordance with a topic schema is illustrated. The topic entry 400 includes a topic identifier 402, where the topic identifier 402 is determined by the topic identification module 204 based upon one or more documents. The topic entry 400 further includes a topic type identifier 404, where the topic type identifier 404 is determined by the topic type classification module 206 and where the topic type identifier 404 is a classification of a topic represented by the topic entry 400. The topic entry 400 additionally includes an identifier for a linked factoid 406 to which the topic entry 400 is linked. In an example, the identifier for the linked factoid 406 is an identifier for the factoid 300. The identifier for the linked factoid 406 may be the unique factoid ID 308 of the factoid 300. It is to be understood that the topic entry 400 may be linked to more than one factoid. Alternatively, the identifier for the linked factoid 406 may be stored external to the topic entry 400 (e.g., separately in the data store 108). The topic entry 400 includes an identifier for a document 408 to which the topic entry 400 is linked. The identifier for the document 408 corresponds to a document from which the topic entry 400 was generated. It is to be understood that the topic entry 400 may be linked to more than one document. The topic entry 400 may include a unique topic identifier 410 that uniquely identifies the topic corresponding to the topic entry 400. The unique topic identifier 410 helps to prevent creation of duplicative topics (explained in greater detail below). In an example, the topic identifier 402 for the topic entry 400 is "Company Y," the topic type 404 is "project," the identifier for the linked factoid is "abc1234," the identifier for the document 408 corresponds to the document from which the factoid 300 was generated, and the unique topic identifier 410 is "xyz9876."

Referring back to FIG. 2, the fact application 110 includes a smart factoid lookup module 212. The smart factoid lookup module 212 is configured to identify one or more factoids (e.g., the factoid 300) stored in the data store 108 based upon a fact in an obtained document, where the fact in the obtained document is identified by the fact name identification module 202 and the fact value detection module 208. It is to be understood that the fact in the obtained document may be outdated. In an example, the obtained document includes the sentence "Company Y has 75 employees." The smart factoid lookup module 212 may also utilize a topic of the obtained document (determined via the topic identification module 204) and a classification of the topic (determined via the topic type classification module 206) in identifying a factoid in the data store 108. According to embodiments, the smart fact lookup module 212 utilizes a deep learning model (pretrained from annotated training datasets) to transform the fact in the obtained document (and optionally the topic and the classification of the topic) into an embedded vector space. According to the embodiments, the smart fact lookup module 212 semantically matches the transformed fact to one or more factoids (e.g., the factoid 300) stored in the data store 108, where the one or more factoids may have a current fact value for the fact in the obtained document. In an example, the smart fact lookup module 212 identifies a factoid in the data store 108 corresponding to the fact. In the example, the factoid includes the "Number of Employees of Company Y" fact name, the "100" fact value (described above). Following the example, the fact value in the obtained document ("75") is replaced with the fact value in the factoid ("100") such that the obtained document displays "100" in place of "75."

The fact application 110 includes a post processing and filtering module 214. The post processing and filtering module 214 is configured to apply heuristic based rules in order to filter certain factoids identified by the smart fact lookup module 212 from further consideration (and hence prevent facts of such factoids from replacing the fact in the obtained document). In an example, the post processing and filtering module 214 filters factoids from consideration that have corresponding metadata that indicates that the fact values in the factoids are dated beyond a threshold amount of time, such as six months. In another example, the post processing and filtering module 214 filters factoids from consideration that have corresponding metadata that indicates that the fact values were set forth by a certain user or a certain type of user.

The fact application 110 includes a ranking module 216. The ranking module 216 is configured to rank the one or more factoids identified by the smart factoid lookup module 212 based upon ranking criteria. The ranking module 216 may also rank the one or more factoids after the post processing and filtering module 214 has filtered some factoids from consideration. The ranking criteria may be based upon datetimes that the one or more factoids were created or updated, identities of users that created or updated the one or more factoids, and/or user-defined criteria (such as identifiers for trusted users).

Referring back to FIG. 1, the data store 108 stores factoids 112 that are generated by the fact application 110. The data store 108 also stores topic entries 114 that are generated by the fact application 110. In an example, the factoids 112 include the factoid 300 described above and the topic entries 114 include the topic entry 400 described above. According to embodiments, the factoids 112 and/or the topic entries 114 are stored in at least one database that is stored in the data store 108, such as a relational database.

The computing environment 100 further includes a computing device 116 that is operated by a user 118. The user 118 may be a member of an enterprise. According to embodiments, the computing device 116 is a desktop computing device, a laptop computing device, a tablet computing device, a smartphone, an augmented reality (AR) computing device, or a virtual reality (VR) computing device. The computing device 116 is in communication with the computing system 102 by way of a network 120 (e.g., the Internet, intranet, etc.). The computing device 116 includes a processor 122 and memory 124, where the memory 124 has a canvas application 126 loaded therein. As will be explained in greater detail below, the canvas application 126, when executed by the processor 122, is configured to display a document to the user, where the document includes or will include facts that may need to be updated due to the facts not reflecting current information. The canvas application 126 may be a word processing application, a spreadsheet application, a slideshow application, a real-time messaging application, or an email application. The canvas application 126 may be an application that executes in a web browser that is loaded in the memory 124 of the computing device 116. According to embodiments, the canvas application 126 is Microsoft Word®, Microsoft® Excel, Microsoft® PowerPoint, Microsoft Teams®, or Microsoft® Outlook. According to embodiments, the web browser is Microsoft Edge®.

The computing device 116 includes input components 128 that enable the user 118 to set forth input to the computing device 116. The input components 128 may include one or more of a mouse, a keyboard, a trackpad, a scroll wheel, a camera, a video camera, a microphone, a touch screen, a controller, etc. The computing device 116 also includes output components 130 that output information to the user 118. The output components 130 include a display 132. According to some embodiments, the display 132 is a touch screen display. According to some embodiments, the display 132 is an AR display or a VR display. The canvas application 126 presents a graphical user interface (GUI) 134 on the display 132, where the GUI 134 displays a document to the user 118. Although not illustrated in FIG. 1, it is to be understood that the output components 130 may also include a speaker and/or a haptic feedback device.

The computing environment 100 further includes computer-readable document storage 136 that stores documents 138. The computer-readable document storage 136 may be associated with an enterprise to which the user 118 belongs. The documents 138 may include metadata. As will be described in greater detail below, the fact application 110 generates the factoids 112 and the topic entries 114 based upon the documents 138. According to some embodiments, the computer-readable document storage 136 is the data store 108. According to some embodiments, the computer-readable document storage 136 is cloud-based storage that is accessible by the computing system 102 and the computing device 116 by way of the network 120. According to some embodiments, the computer-readable document storage 136 is comprised by a separate sever computing device (not illustrated in FIG. 1) that is accessible by the computing system 102 and the computing device 116 by way of the network 120. According to some embodiments, the computer-readable document storage 146 is comprised by the computing device 116. The computer-readable document storage 146 may be or include disk-based storage, in-memory storage, or a combination thereof. Although the computer-readable document storage 146 is described as being a single storage location, it is to be understood that the computer-readable document storage 146 may include many storage devices located at different locations (e.g., distributed storage).

The documents 138 include one or more of word processing documents, spreadsheets, slideshows, real-time messages, a report generated by a reporting system, and emails. According to embodiments, the documents 138 include word document generated via Microsoft Word®, spreadsheets generated via Microsoft® Excel, spreadsheets generated via Microsoft® PowerPoint, real-time messages sent and/or received by Microsoft Teams®, or emails sent and/or received by Microsoft® Outlook.

FIG. 5 illustrates an example off-line process flow 500 performed by the fact application 110 that facilitates detecting and updating stale information. With reference generally now to FIGS. 1-5, the off-line process flow 500 is now set forth.

The fact application 110 obtains a first document 140 from the documents 138 stored in the computer-readable document storage 136. In an example, the first document 140 has been previously generated and stored in the computer-readable document storage 136. In another example, the fact application 110 obtains the first document 140 when the first document 140 is saved to the computer-readable document storage 136. The first document 140 includes first text (e.g., numbers, words, or a combination thereof). Additionally or alternatively, the first document 140 may include non-textual data, such as an image. In an example, the first text includes the sentence "The President of Company Y is John Doe."

The fact application 110, by way of the fact name identification module 202 and the fact value detection module 208, identifies a first fact referenced in the first document 140 using one or more NLP algorithms, where the first fact includes a fact name and a first fact value. In the example given above, the fact name is "President of Company Y" and the first fact value is "John Doe."

The fact application 110, by way of the topic identification module 204, determines a topic of the first document 140 based upon the first text of the first document 140 using a deep learning model. The fact application 110 may also determine the topic based upon metadata for the first document 140. In the example given above, the topic of the first document 140 is "Company Y."

The fact application 110, by way of the topic type classification module 206, determines a classification of the topic of the first document 140 based upon the topic of the first document 140 and the first text of the first document 140. The fact application 110 may also determine the classification of the topic based upon metadata for the first document 140. In the example given above, the classification of the topic is "organization."

The fact application 110, by way of the factoid generation module 210, generates a factoid 142 based upon the fact name in the first document 140, the first fact value in the first document 140, and the topic of the first document 140. The factoid 142 may be or include the factoid 300 described above and the factoid 300 described above may be or include the factoid 142. The fact application 110 stores the factoid 142 in the data store 108 as part of the factoids 112. According to embodiments, the fact application 110 transforms the factoid 142 into an embedded vector space using a deep learning model and stores the transformed factoid (not shown in FIG. 1) in the data store 108. In an example, the factoid 142 includes the fact name of "President of Company Y" and the first fact value of "John Doe."

The fact application 110, by way of the factoid generation module 210, may also generate a topic entry 144 based upon the topic of the first document 140, the classification of the topic of the first document 140, and the first text of the first document 140. The topic entry 144 may be or include the topic entry 400 described above and the topic entry 400 described above may be or include the topic entry 144. The fact application 110 stores the topic entry 144 in the data store 108 as part of the topic entries 114.

It is to be understood that the fact application 110 may perform the above-described processes to generate many different factoids from the first document 140 and that the fact application 110 may store the many different factoids in the data store 108 as part of the factoids 112. It is also to be understood that the fact application 110 may perform the above-described processes on other documents in the documents 138 in order to generate additional factoids and/or topic entries and that the fact application 110 may store the additional factoids and the topic entries in the data store 108 as part of the factoids 112 and the topic entries 114, respectively.

In certain scenarios, the data store 108 may already include a topic entry for the topic of the first document 140. In such scenarios, the fact application 110 does not generate the topic entry 144 in the data store 108. Instead, the fact application 110 identifies a topic entry in the topic entries 114 corresponding to the first document 140 based upon the topic and the classification of the topic determined by the fact application 110 from the first document 140. The fact application 110 modifies the topic entry to include (1) a link to the factoid 142 generated for the first document 140 and (2) a link to the first document 140.

In other scenarios, the data store 108 may already include a factoid corresponding to the factoid 142, where the factoid includes the fact name and a fact value, and where the factoid has been generated by the fact application 110 prior to the fact application 110 obtaining the first document 140. In such scenarios, prior to storing the factoid 142 in the data store 108, the fact application 110 compares the first fact value in the factoid 142 with the fact value in the fact value. When the first fact value and the fact value are identical, the fact application 110 may omit storing the factoid 142 in the data store 108 to avoid storing duplicative factoids. When the first fact value and the fact value are not identical, the fact application 110 may store the factoid 142 in the data store.

Although the off-line process flow 500 has been described above as being executed off-line on the first document 140, other possibilities are contemplated. According to embodiments, the fact application 110 generates the factoid 142 and the topic entry 144 in real-time as the first document 140 is being authored by a user. For example, the fact application 110 generates the factoid 142 and the topic entry 144 as the fact name and the first fact value are set forth to the first document 140 as input by a user.

Figure 6:
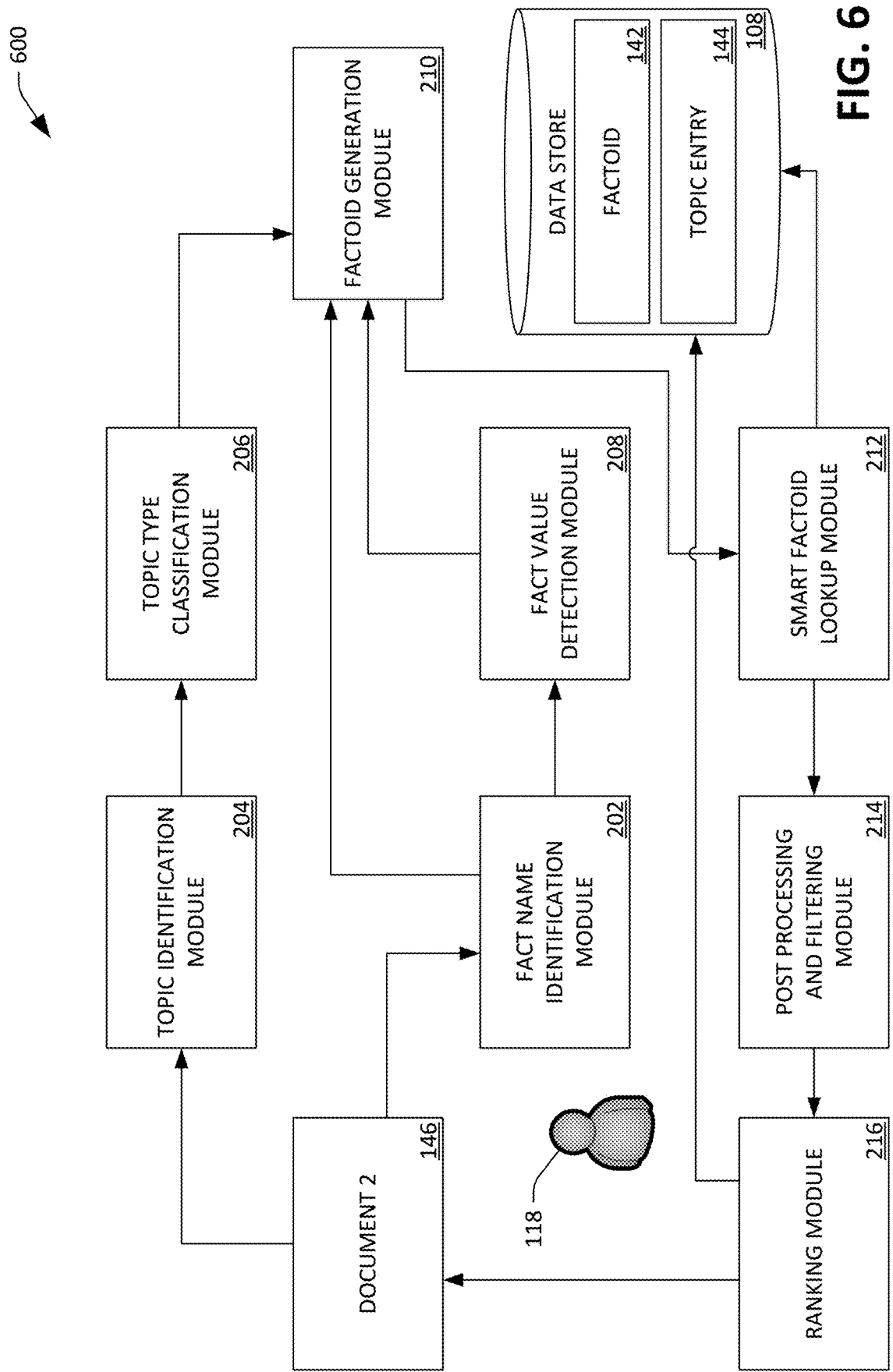
FIG. 6 illustrates an example on-line process flow performed by a fact application that facilitates detecting and updating stale information.

FIG. 6 illustrates an example on-line process flow 600 performed by the fact application 110 that facilitates detecting and updating stale information. With reference generally now to FIGS. 1-4 and 6, the on-line process flow 600 is now set forth.

The fact application 110 obtains a second document 146 from the computer-readable document storage 136. The fact application 110 may obtain the second document 146 when the computing device 116 opens the second document 146 based upon input received from the user 118 and/or while the second document 146 is being presented on the display 132 to the user 118.

In an example in which the computer-readable document storage 146 is cloud-based storage included in a cloud-based computing platform, the computing device 116 receives a selection of an identifier for the second document 146 by the user 118, where the identifier for the second document 146 is being presented on the display 132. Upon receiving the selection, the computing device 116 transmits the identifier for the second document 146 to the cloud-based computing platform, which in turn locates the second document 146 in the computer-readable document storage 136. The cloud-based computing platform transmits data to the computing device 146 which causes a local copy of the second document 148 to be stored in the memory 124. The canvas application 126 presents the local copy of the second document 148 within the GUI 134. The second document 146 and the local copy of the second document 148 are synced such that changes made to the second document 146 are propagated to the local copy of the second document 148 and changes made to the local copy of the second document 148 are propagated to the second document 146. In the example, the fact application 110 obtains the second document 146 when the local copy of the second document 148 is presented within the GUI 134.

In an example, the second document 146 was originally authored by the user 118 at a time prior to generation of the first document 140 and prior to generation of the factoid 142. As such, the second document 146 may include outdated information. Following the example given above, the second document 146 includes the sentence "The President of Company Y is Jane Smith."; however, as noted above, "The President of Company Y" is actually "John Doe" (as determined via the first document 140). As the first document 140 was generated subsequent to the second document 146, the sentence in the second document 146 includes outdated information.

The fact application 110, by way of the fact name identification module 202 and the fact value detection module 208, identifies a second fact referenced in the second document 146 using the one or more NLP algorithms, where the second fact includes the fact name and a second fact value. Following the example given above, the fact name is "President of Company Y" and the second fact value is "Jane Smith."

The fact application 110, by way of the topic identification module 204, may also determine a topic of the second document 146 based upon the second text of the second document 146 using the deep learning model. The fact application 110 may also determine the topic based upon metadata for the first document 140. In the example given above, the topic of the second document 146 is "Company Y."

The fact application 110, by way of the topic type classification module 206, determines a classification of the topic of the second document 146 based upon the topic of the second document 146 and the second text of the second document 146. The fact application 110 may also determine the classification of the topic based upon metadata for the second document 146. In the example given above, the classification of the topic is "organization."

The fact application 110, by way of the smart factoid lookup module 212, identifies the factoid 142 stored in the data store 108 based upon the fact name in the second document 146 and at least one of the topic of the second document 146 and/or the classification of the topic of the second document 146.

In an example, the fact application 110 executes a search over the factoids 112 based upon the fact name in the second document 146 and at least one of the topic of the second document 146 and/or the classification of the topic of the second document 146. The search produces search results, where the search results include the factoid 142.

In another example, the fact application 110 executes a first search over the topic entries 144 based upon at least one of the topic of the second document 146 and/or the classification of the second document 146. The first search produces first search results, where the first search results include the topic entry 144. Based upon data within the topic entry 144 (e.g., the identifier for the linked factoid 406, which, as noted above, may be an identifier for the factoid 142), the fact application 110 executes a second search over the factoids 112. The second search produces second search results, where the second search results include the factoid 142.

According to embodiments, the fact application 110, by way of the smart factoid lookup module 212, transforms the fact name, the second fact value, and one or more of the topic and the classification of the topic of the second document 146 into an embedded vector in an embedded vector space using a deep learning model. According to embodiments, the fact application 110 transforms the factoids 112 into vectors in the embedded vector space using the deep learning model. According to the embodiments, the fact application 110 semantically matches the embedded vector generated from the second document 146 to an embedded vector representing the factoid 142. The fact application 110 identifies the factoid 142 based upon the embedded vector representing the factoid 142.

The fact application 110 performs a comparison between the first fact value from the factoid 142 and the second fact value from the second document 146. When the first fact value from the factoid 142 is identical to the second fact value from the second document 146, the fact application 110 takes no action with respect to the second fact value in the second document 146. When the first fact value from the factoid 142 differs from the second fact value from the second document 146, the fact application 110 causes a message to be displayed on the display 132. In an example, the fact application 110 transmits data to the canvas application 126 which causes the canvas application 126 to present the message on the display 132 within the GUI 134 concurrently with the second document 146 being presented within the GUI 134. The message prompts the user 118 to accept or reject replacement of the second fact value in the second document 146 with the first fact value from the factoid 142. As such, the message includes an accept button and a reject button. When the accept button is selected by the user 118, the second fact value in the second document 146 is replaced with the first fact value from the factoid 142 such that the second document 146 (or the local copy of the second document 148) display the first fact value in the place of the second fact value. Following the example given above, the fact application 110 causes "The President of Company Y is Jane Smith." in the second document 146 to be replaced with "The President of Company Y is John Doe." When the reject button is selected by the user 118, the second fact value remains in the second document 146 and hence the second document 146 (or the local copy of the second document 146) continues to display the second fact value (and not the first fact value from the factoid 142). The message may also include source information for the first fact value, where the source information is based upon the factoid 142 and/or the topic entry 144 that is linked to the factoid 142. The source information may include an identifier for the first document 140 (as the first fact value in the factoid 142 was generated based upon the first document 140), a datetime on which the first fact value was generated, an identifier for a user that set forth the first fact value to the first document 140, etc.

In an example, the second document 146 was generated or last modified prior to generation of the first document 140. In the example, the factoid 142 includes first metadata that includes a first datetime on which the factoid was generated or last updated and the second document 146 includes second metadata that includes a second datetime on which the second document 146 was generated or last modified. In the example, the fact application 110 compares the first datetime from the first metadata of the factoid 142 with the second datetime from the second metadata of the second document 146. When the first datetime occurs after the second datetime, the fact application 110 causes the message (described above) to be displayed on the display 132.

It is to be understood that the fact application 110 may identify a plurality of factoids from the factoids 112 based upon the fact name in the second document 146 and at least one of the topic of the second document 146 and/or the classification of the topic of the second document 146, where the plurality of factoids include the factoid 142. According to embodiments, the fact application 110, via the post processing and filtering module 214, executes heuristic based rules (described above) to filter certain factoids from the plurality of factoids. Additionally or alternatively, the fact application 110, via the ranking module 216, may rank the plurality of factoids based upon ranking criteria (described above). The fact application 110 may select a top-ranked factoid (e.g., the factoid 142) to present to the user 118 in the message described above. According to embodiments, the fact application 110 may select more than one ranked factoid to present to the user 118 in the message described above.

Although the fact application 110 has been described above as prompting the user to replace the second fact value in the second document 146 with the first fact value from the factoid 142, other possibilities are contemplated. According to embodiments, the fact application 110 automatically replaces the second fact value with the first fact value. According to the embodiments, the fact application 110 causes a notification to be displayed to the user 118 indicating that replacement has occurred.

Although the second document 146 has been described above as being an existing document that was generated prior to the first document 140, other possibilities are contemplated. According to embodiments, the second document 146 is a newly generated document that is currently being authored by the user 118 via the computing device 116. According to the embodiments, the fact name and the second fact value are input by the second user 118 into the second document 146. According to the embodiments, the fact application 110 is configured to identify the fact name and the second fact value in real-time as the user 118 is authoring the second document 146. According to the embodiments, the fact application 110 performs the above-described processes to identify the factoid 142 and prompts the user 118 to replace the second fact value in the second document 146 with the first fact value in the factoid 142 using the message described above.

According to embodiments, the second document 146 is a real-time message that is composed by the user 118 via a real-time messaging application during a chat session between the user 118 and at least one other user (e.g., a second user). As such, the fact name and the second fact value are included in the real-time message. According to the embodiments, the fact application 110 is configured to identify the fact name and the second fact value in the real-time message as the user 118 is composing the real-time message on the computing device 116. According to the embodiments, the fact application 110 performs the above-described processes to identify the factoid 142 and prompts the user 118 to replace the second fact value in the real-time message with the first fact value in the factoid 142 prior to the real-time messaging application transmitting the real-time message during the chat session. Alternatively, the fact application 110 may perform the above-described processes after the real-time message has been transmitted and notify the user 118 that the second fact value included in the real-time message is potentially inaccurate.

According to embodiments, the second document 146 is an email that is composed by the user 118 via an email application, where the email is to be sent to an email address of a second user (or several users). As such, the fact name and the second fact value are included in the email. According to the embodiments, the fact application 110 is configured to identify the fact name and the second fact value in the email as the user 118 is composing the email on the computing device 116. According to the embodiments, the fact application 110 performs the above-described processes to identify the factoid 142 and prompts the user 118 to replace the second fact value in the email with the first fact value in the factoid 142 prior to the email application transmitting the email to the email address of the second user. Alternatively, the fact application 110 may perform the above-described processes on the email after a "send" email button is selected by the user 118, but before the email is actually transmitted.

According to embodiments, the second document 146 is to be shared electronically with a second user over the network 120. As such, the computing device 116 receives an indication that the user 118 wishes to share the second document 146. Upon receiving the indication, the computing device 116 transmits a message to the fact application 110, which in turn causes the fact application 110 to perform the above-described processes. Prior to the second document 146 being shared, the fact application 110 prompts the user 118 to accept replacement of the second fact value (which is outdated) in the second document 146 with the first fact value in the factoid 142. The computing device 116 may receive an indication that the user 118 consents to the replacement, and the fact application 110 may replace the second fact value with the first fact value. The computing device 116 then shares the second document 146 is with the second user. In this manner, the fact application 110 helps to ensure that the second document 146 is shared with current, up-to-date information.

According to embodiments, the fact application 110 updates the NLP algorithm and/or the deep learning model (described above) based upon the user 118 accepting or rejecting replacement of the second fact value in the second document 146 with the first fact value from the factoid 142. In an example in which the deep learning model comprises a plurality of nodes connected by a plurality of edges having corresponding weights assigned thereto, the fact application 110 modifies one or more weights in the weights based upon whether the user 118 accepted or rejected replacement. By modifying the NLP algorithm and/or the deep learning model based upon feedback from the user 118, the fact application 110 helps to ensure that facts (or topics) are more accurately identified in documents.

FIGS. 7A-D illustrate example views of a document graphical user interface (GUI) that facilitates detecting and updating stale information.

With reference now to FIG. 7A, an example document 700 ("Project Z Plan") is illustrated. The canvas application 126 presents the document 700 within the GUI 134. The document 700 may correspond to the second document 146 described above. As such, the document 700 may be a document that was previously authored by the user 118 (or another user), but that now includes outdated information.

Figure 7B:
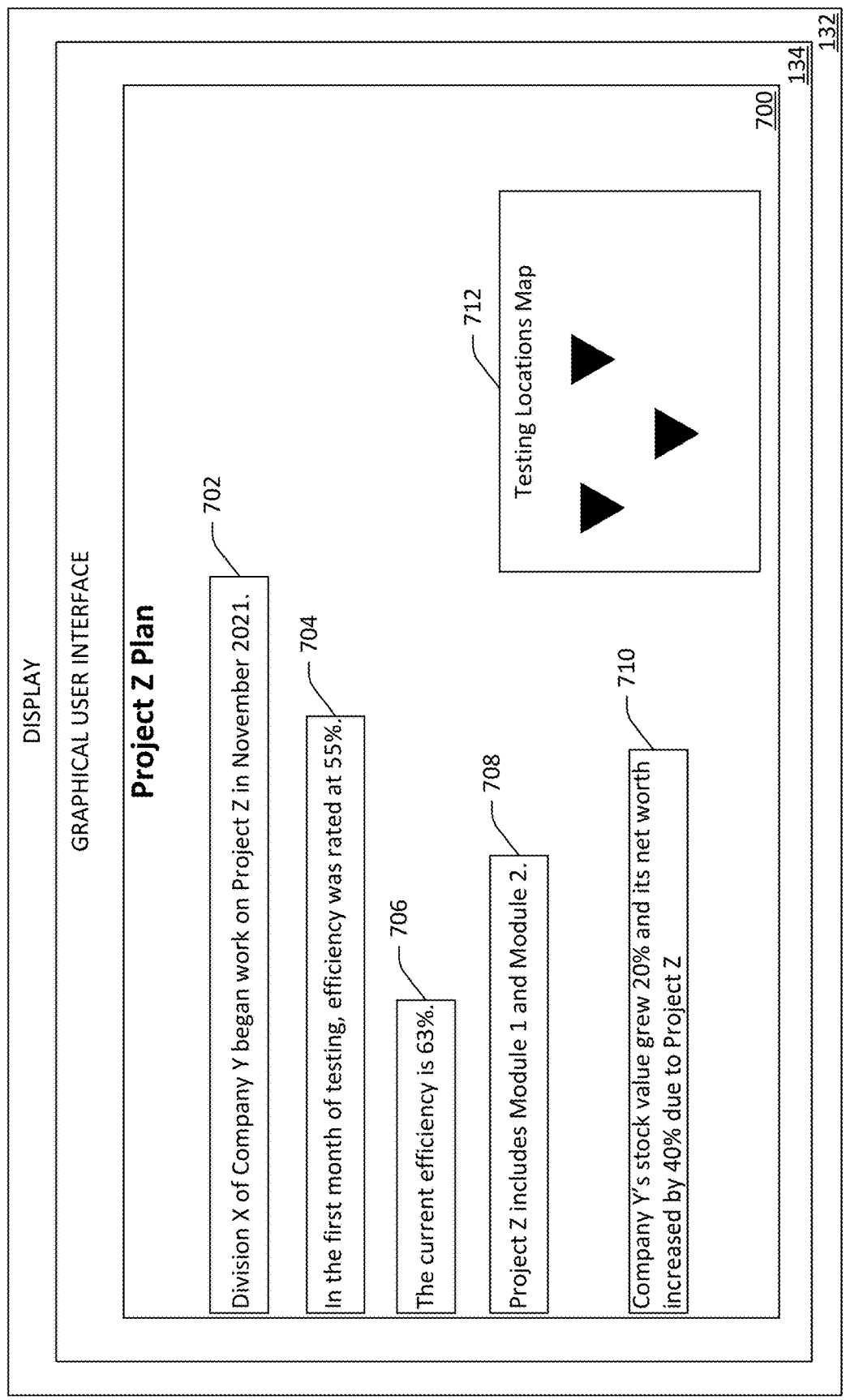

With reference now to FIG. 7B, the document 700 is illustrated after the fact application 110 has identified a plurality of facts referenced in the document 700 using the fact name identification module 202 and the fact value detection module 208. As illustrated in FIG. 7B, the fact application 110 has identified a universal fact 702 ("Division X of Company Y began work on Project Z in November 2021") in the document 700. The universal fact 702 will never change, and as such, the fact application 110 will not change the universal fact 702. The fact application 110 has also identified a time-linked fact 704 ("In the first month of testing, efficiency was rated at 55%.") in the document 700. The time-linked fact 704 is linked to the first month of testing, and as such, the fact application 110 will not modify the time-linked fact 704. The fact application 110 has additionally identified an atomic fact 706 ("The current efficiency is 63%.") in the document 700. The fact application 110 has also identified a subjective fact 708 ("Project Z includes Module 1 and Module 2") in the document 700. The fact application 110 has further identified an interlinked fact 710 ("Company Y's stock value grew 20% and its net worth increased by 40% due to Project Z") in the document 700. The fact application 110 has also identified a non-textual fact 712 ("The Testing Locations Map" and corresponding triangle markers that illustrate where testing locations are located) in the document 700.

Figure 7C:
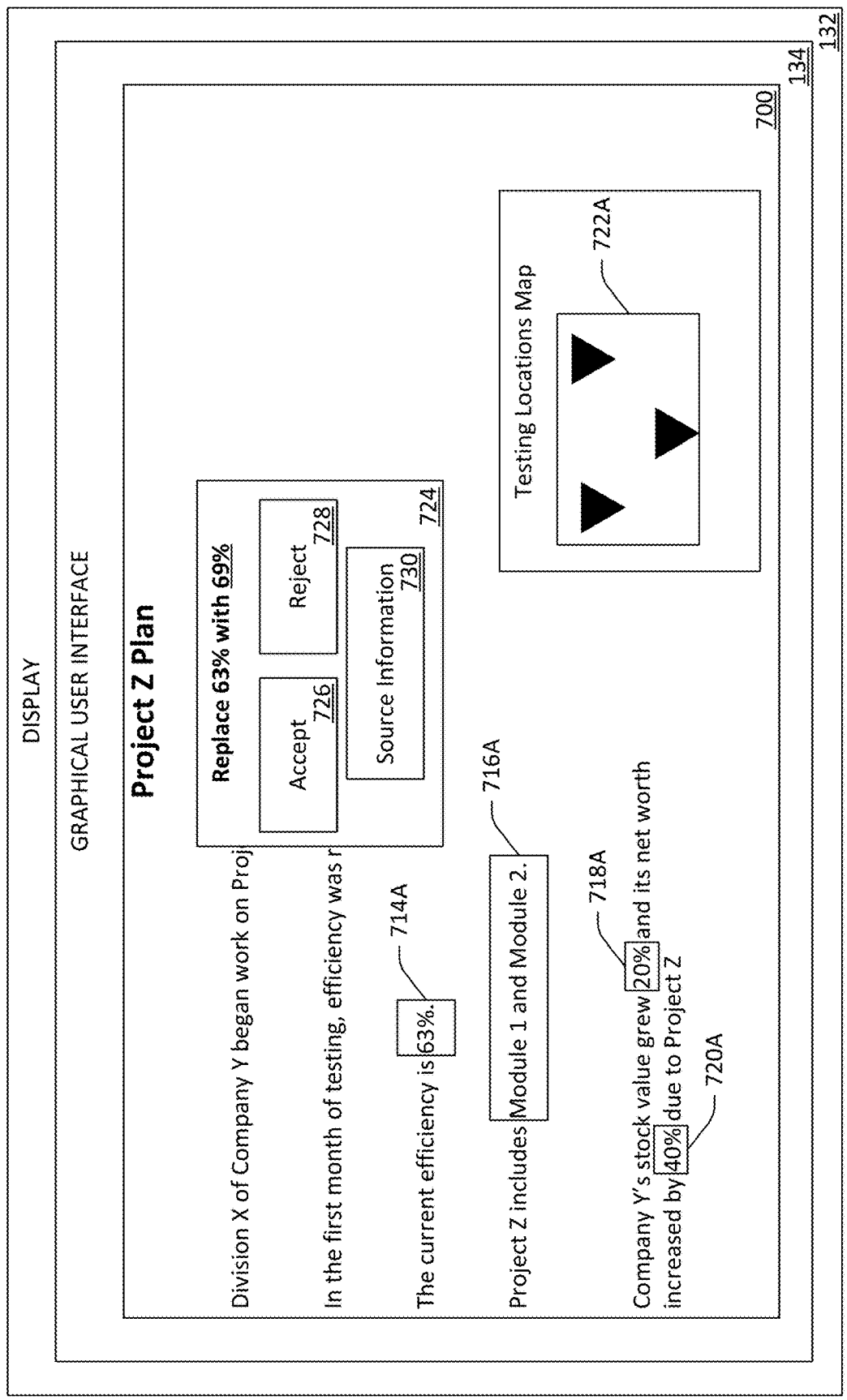

Referring now to FIG. 7C, the document 700 is illustrated after the fact application 110 has identified factoids corresponding to the plurality of facts referenced in the document, where the factoids include updated fact values. As illustrated in FIG. 7C, the fact application 110 has highlighted a fact value 714A ("63%") corresponding to the atomic fact 706. The fact application 110 has further highlighted a fact value 716A ("Module 1 and Module 2") corresponding to the subjective fact 708. The fact application 110 has also highlighted a first fact value 718 ("20%") and a second fact value 720A ("40%") corresponding to the interlinked fact 710. The fact application 110 has further highlighted a non-textual fact value 722A (the three triangle markers within the map) corresponding to the non-textual fact 712. Each of the fact values 714A-722A are out of date.

As illustrated in FIG. 7C, the fact application 110 causes a message 724 to be displayed within the GUI 134 shown on the display 132. According to some embodiments, the message 724 is overlaid upon the document 700. According to other embodiments, the message 724 is included in a side bar that is presented concurrently with the document 700 so as to not obstruct view of the document 700. The message 724 may be included in a region that is assigned to a spell checker or editor of a word processing application. The message 724 includes a prompt for the user 118 to replace the fact value 714A ("63%") in the document 700 with an updated fact value (69%), where the updated fact value is identified from a factoid stored in the data store 108, where the factoid has been generated from another document (e.g., one of the documents 138 stored in the computer-readable document storage 136). The message includes an accept button 726 and a reject button 728. When the accept button 726 is selected by the user 118, the fact value 714A ("63%") is replaced with the updated fact value ("69%"). When the reject button 728 is selected by the user 118, the fact value 714A ("63%") is not replaced with the updated fact value ("69%"). The message 724 may include source information 730 about the source of the updated fact value such as an identifier for the document from which the updated fact value was generated, an identifier of a user that created or modified the updated fact value, a datetime on which the updated fact value was generated, etc. The fact application 110 may display a message similar to the message 724 for each of the remaining fact values (716A-722A) in the document 700 in order for the user 118 to accept or reject replacement of the remaining fact values with updated fact values. The fact application 110 may display messages such as the message 724 sequentially or the messages may be displayed concurrently on the display 132.

Figure 7D:
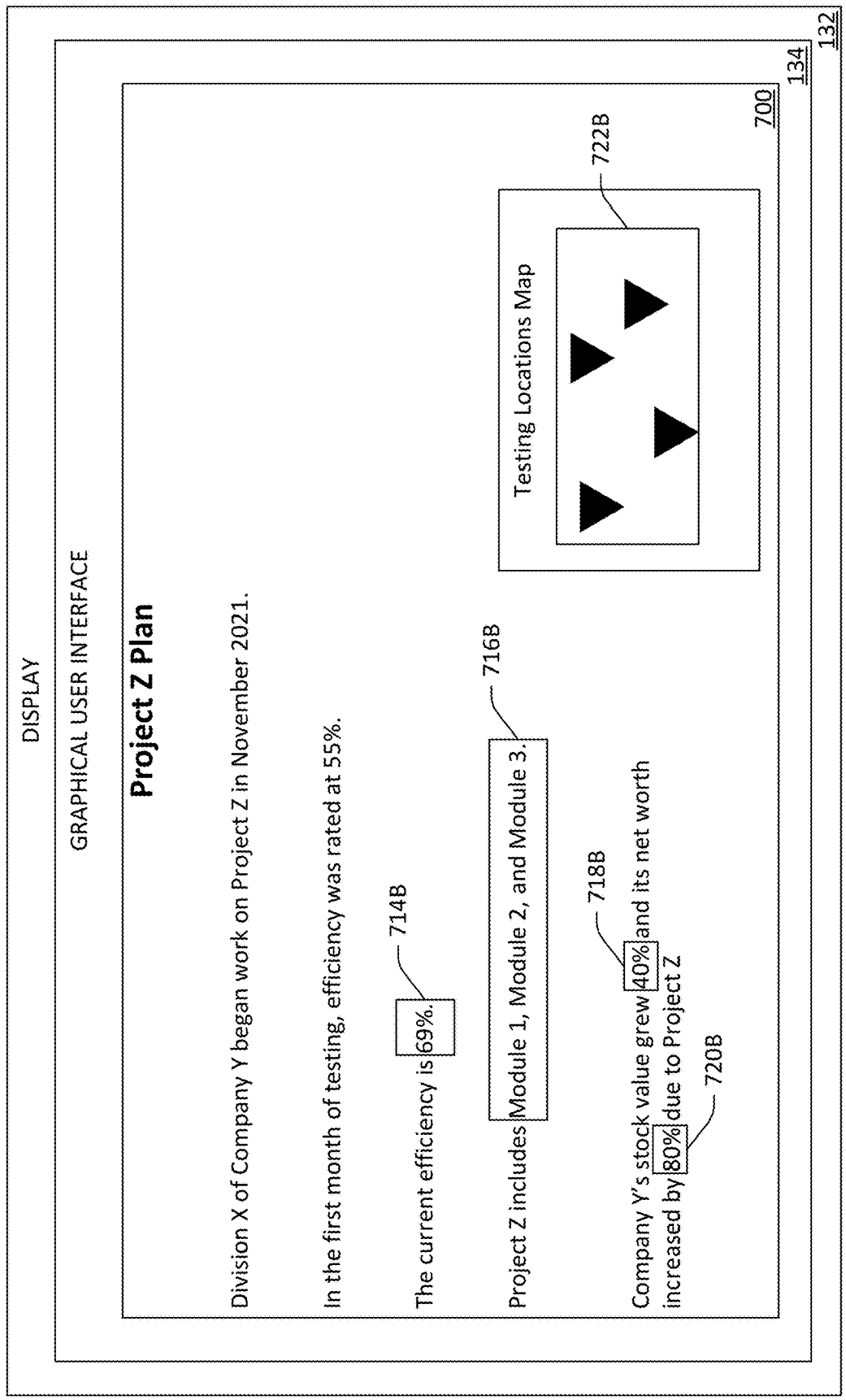

Turning now to FIG. 7D, the document 700 is illustrated after the user 118 has accepted replacement of each of the fact values 714A-722A with updated fact values from some of the factoids 112 stored in the data store 108. As illustrated in FIG. 7D, the fact value 714A ("63%") has been replaced with a fact value 714B ("69%"). The fact value 716A ("Module 1 and Module 2") has been replaced with a fact value 714B ("Module 1, Module 2, and Module 3"). The first fact value 718A ("20%") and the second fact value 720A ("40%") corresponding to the interlinked fact 710 have been replaced with a first fact value 718B ("40%") and a second fact value 720B ("80%"), respectively. The non-textual fact value 722A (the three triangle markers within the map) has been replaced with a non-textual fact value 722B (four triangle markers within the map).

FIGS. 8A-E illustrate example views of a real-time message chat graphical user interface (GUI) that facilitates detecting and updating stale information. In the examples illustrated in FIGS. 8A-E, the canvas application 126 is a real-time messaging application that is being used by the user 118 to communicate with a second user.

With reference to FIG. 8A, an example real-time message chat 800 is illustrated. As illustrated in FIG. 8A, the real-time message chat 800 includes a question ("What is the latency on Project Z?") posed by a second user to the user 118. The real-time message chat 800 includes a message box 802 that is configured to receive a real-time message as input from the user 118.

Referring now to FIG. 8B, the real-time message chat 800 is illustrated after the user 118 has set forth a real-time message as input to the message box 802 and after the fact application 110 has identified a fact ("The latency is 750 ms") in the real-time message using the above-described processes.

Referring now to FIG. 8C, the real-time message chat 800 is illustrated after the fact application 110 has identified a factoid corresponding to the fact referenced in the real-time message, where the factoid includes an updated fact value, and further where the factoid is stored as part of the factoids 112 stored in the data store 108. The fact application 110 has generated the factoid based upon a document in the documents 138 stored in the computer-readable document storage 136. As illustrated in FIG. 8C, the fact application 110 has highlighted a fact value 804A ("750 ms") to illustrate that the fact value 804A is (potentially) outdated. The fact application 110 causes a message 806 to be displayed within the GUI 134 shown on the display 132. According to some embodiments, the message 724 is overlaid upon the real-time message chat 800. According to other embodiments, the message 806 is included in a side bar that is presented concurrently with the real-time message chat 800 so as to not obstruct view of the real-time message chat 800. The message 806 prompts the user 118 to replace the fact value 804A ("750 ms") in the message box 802 with an updated fact value ("700 ms"), where the updated fact value is identified from the factoid. The message includes an accept button 808 and a reject button 810. When the accept button 808 is selected by the user 118, the fact value 804A ("750 ms") is replaced with the updated fact value ("700 ms"). When the reject button 810 is selected by the user 118, the fact value 804A ("750 ms") is not replaced with the updated fact value ("700 ms"). The message 806 may include source information 812 about the source of the updated fact value such as an identifier for the document from which the updated fact value was generated, an identifier of a user that created or modified the updated fact value, a datetime on which the updated fact value was generated, etc.

Referring now to FIG. 8D, the real-time message chat 800 is illustrated after the user 118 has accepted replacement of the fact value 804A. As illustrated in FIG. 8D, the message box now displays a fact value 804B ("700 ms") in place of the fact value 804A ("750 ms").

Turning now to FIG. 8E, the real-time message chat 800 is illustrated after the user 118 accepts replacement of the fact value 804A with the fact value 804B and after the real-time message is transmitted. The response real-time message chat 800 includes current information ("700 ms") due to operation of the fact application 110 described above.

FIGS. 9A-D illustrate example views of an email graphical user interface (GUI) that facilitates detecting and updating stale information. In the examples illustrated in FIGS. 9A-D, the canvas application 126 is an email application that is being used by the user 118 to draft an email that is to be sent to an electronic account (e.g., an email address) of a second user.

With reference now to FIG. 9A, an example email 900 is illustrated. The email includes an email address of the second user ("user2@companyY.com"), a subject ("Project Z") and an email message body 902 ("Hi User 2, . . . ") that is composed by the user 118. The email also includes a send button 904.

Figure 9B:
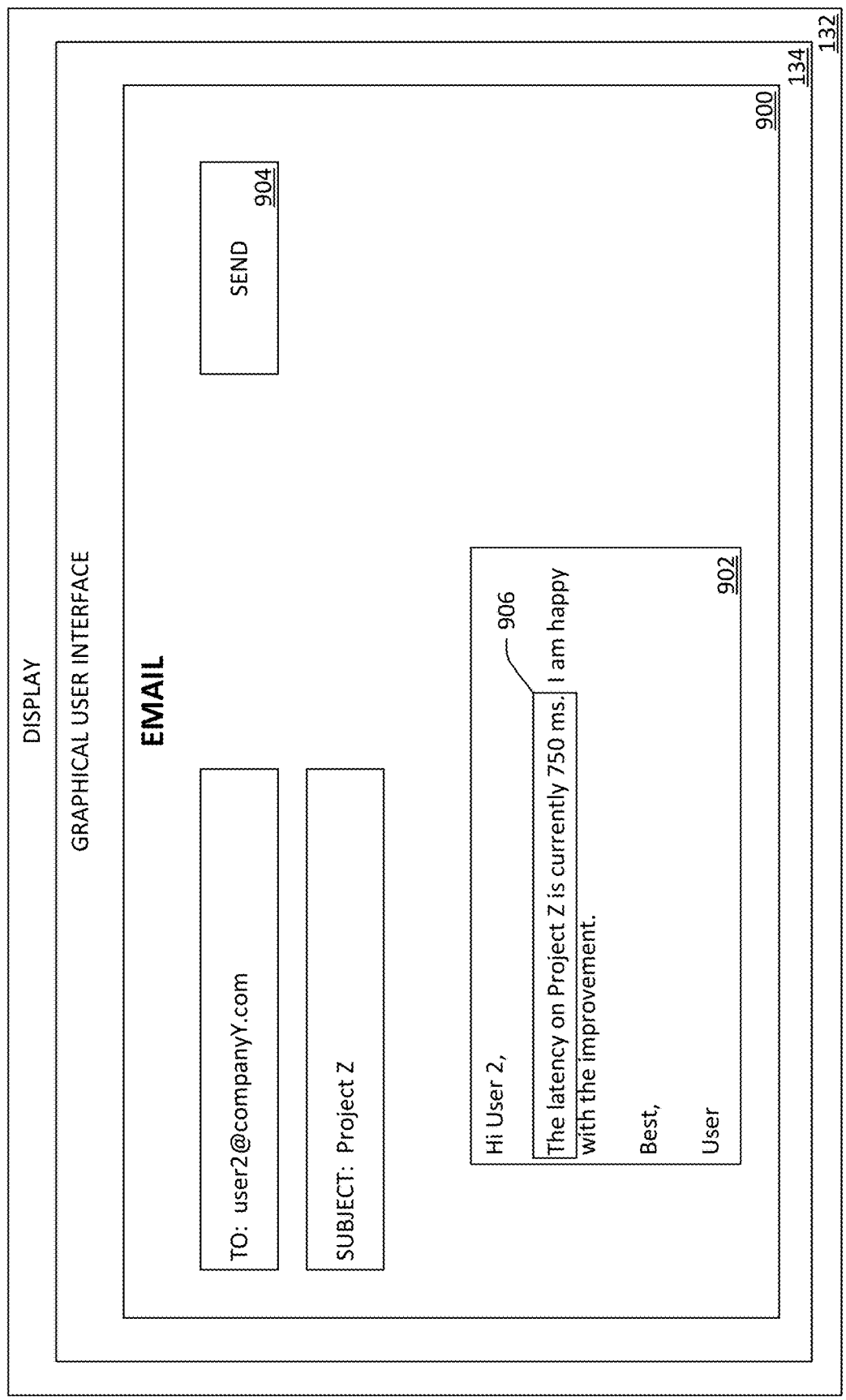

With reference now to FIG. 9B, the email 900 is illustrated after the fact application 110 has identified a fact 906 in the email message body 902. In one example, the fact application 110 identifies the fact 906 in real-time as the user 118 composes the email 900. In another example, the fact application 110 identifies the fact 906 after the send button 904 is selected, but before the email 900 is transmitted to an email address of the second user.

Figure 9C:
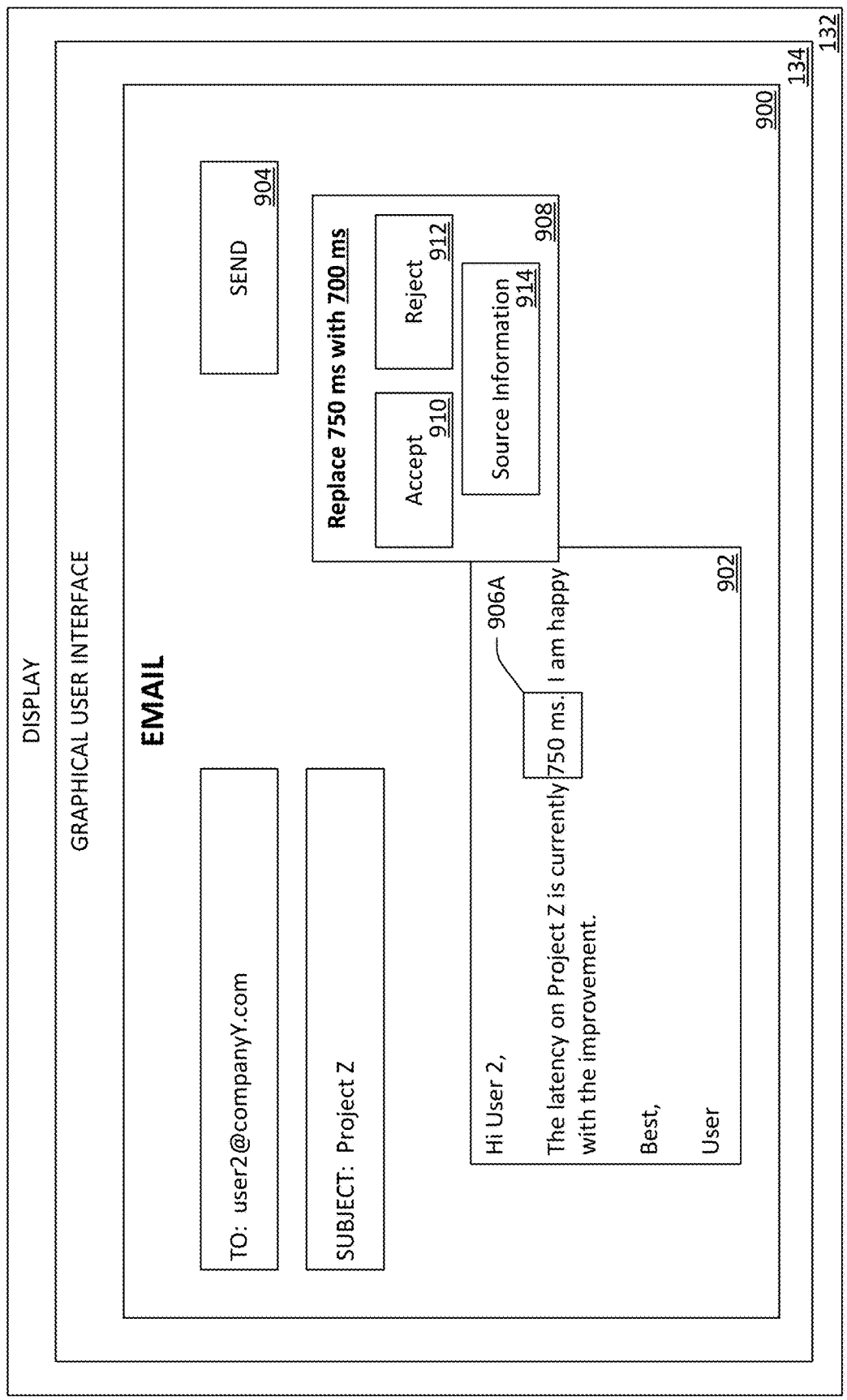

Turning now to FIG. 9C, the email 900 is illustrated after the fact application 110 has identified a factoid in the factoids 112 stored in the data store 108 corresponding to the fact 906. As illustrated in FIG. 9C, the fact application 110 has highlighted a fact value 906A ("750 ms") corresponding to the fact 906 to illustrate that the fact value 906 is (potentially) outdated. The fact application 110 causes a message 908 to be displayed within the GUI 134 shown on the display 132. According to some embodiments, the message 908 is overlaid upon the email 900. According to other embodiments, the message 908 is included in a side bar that is presented concurrently with email 900 so as to not obstruct view of the email 900. The message 908 prompts the user 118 to replace the fact value 906A ("750 ms") in the email message body 902 with an updated fact value ("700 ms"), where the updated fact value is identified from the factoid. The message 908 includes an accept button 910 and a reject button 912. When the accept button 910 is selected by the user 118, the fact value 906A ("750 ms") is replaced with the updated fact value ("700 ms"). When the reject button 912 is selected by the user 118, the fact value 906A ("750 ms") is not replaced with the updated fact value ("700 ms"). The message 908 may include source information 914 about the source of the updated fact value such as an identifier for the document from which the updated fact value was generated, an identifier of a user that created or modified the updated fact value, a datetime on which the updated fact value was generated, etc.

Figure 9D:
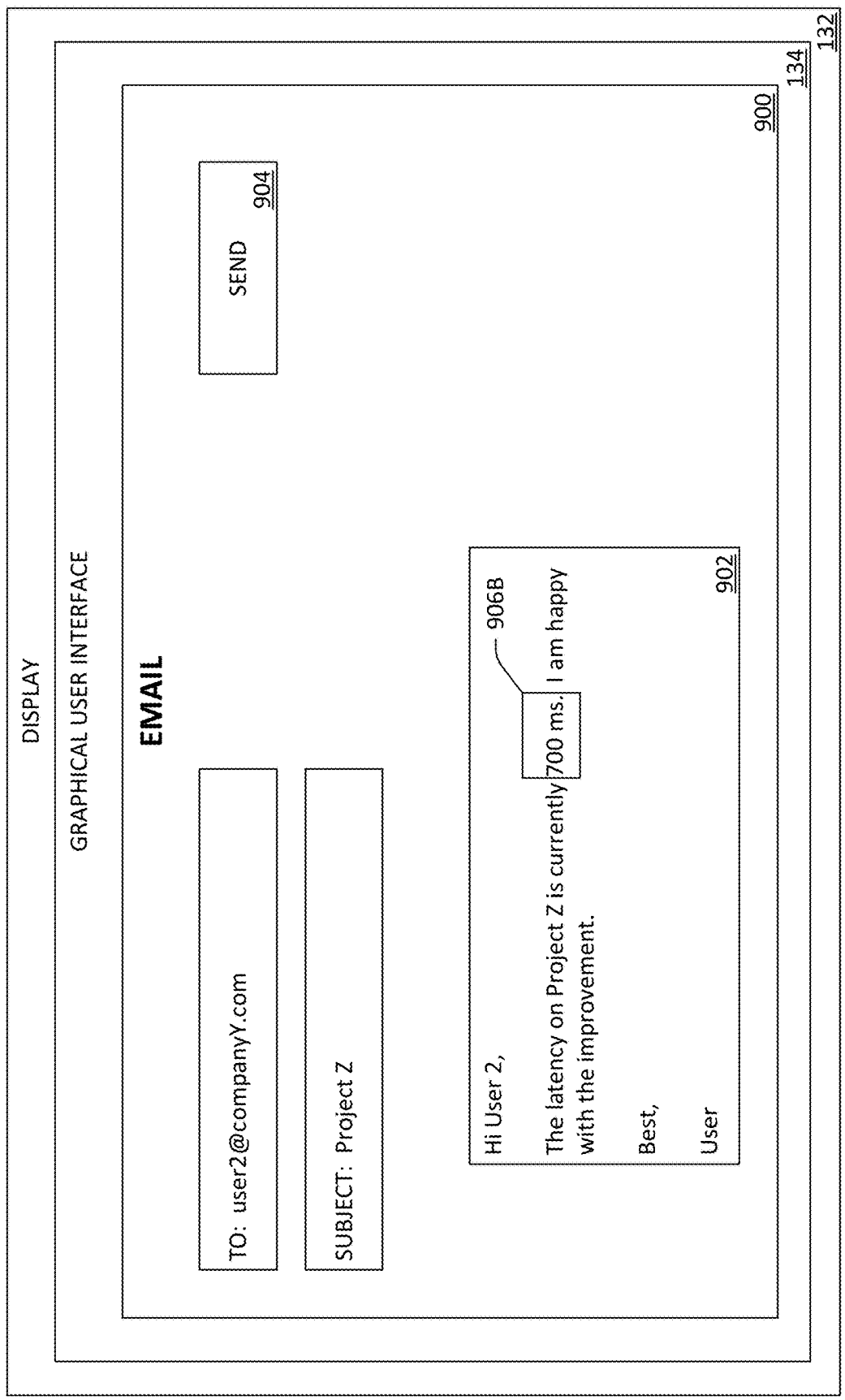

Referring now to FIG. 9D, the email 900 is illustrated after the accept button 910 is selected by the user 118. As illustrated in FIG. 9D, the fact value 906A ("750 ms") in the email message body 902 has been replaced with an updated fact value 906B ("700 ms"). When the send button 904 is selected, the email 900 (including the text in the email message body 902) is transmitted to the email address of the second user.

Figure 10:
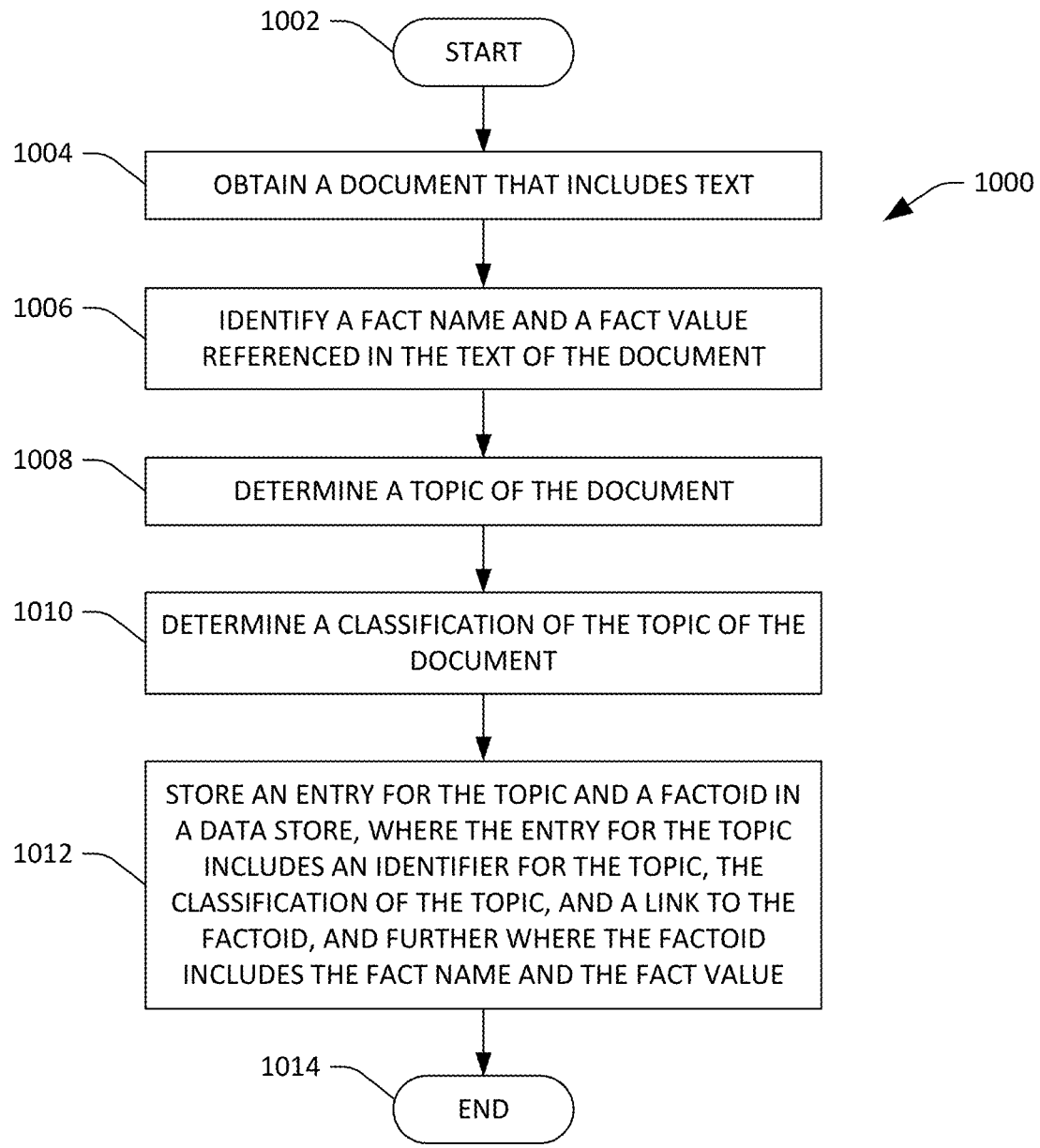
FIG. 10 is a flow diagram that illustrates an example methodology executed by a computing system off-line that facilitates detecting and updating stale information.
Figure 11:
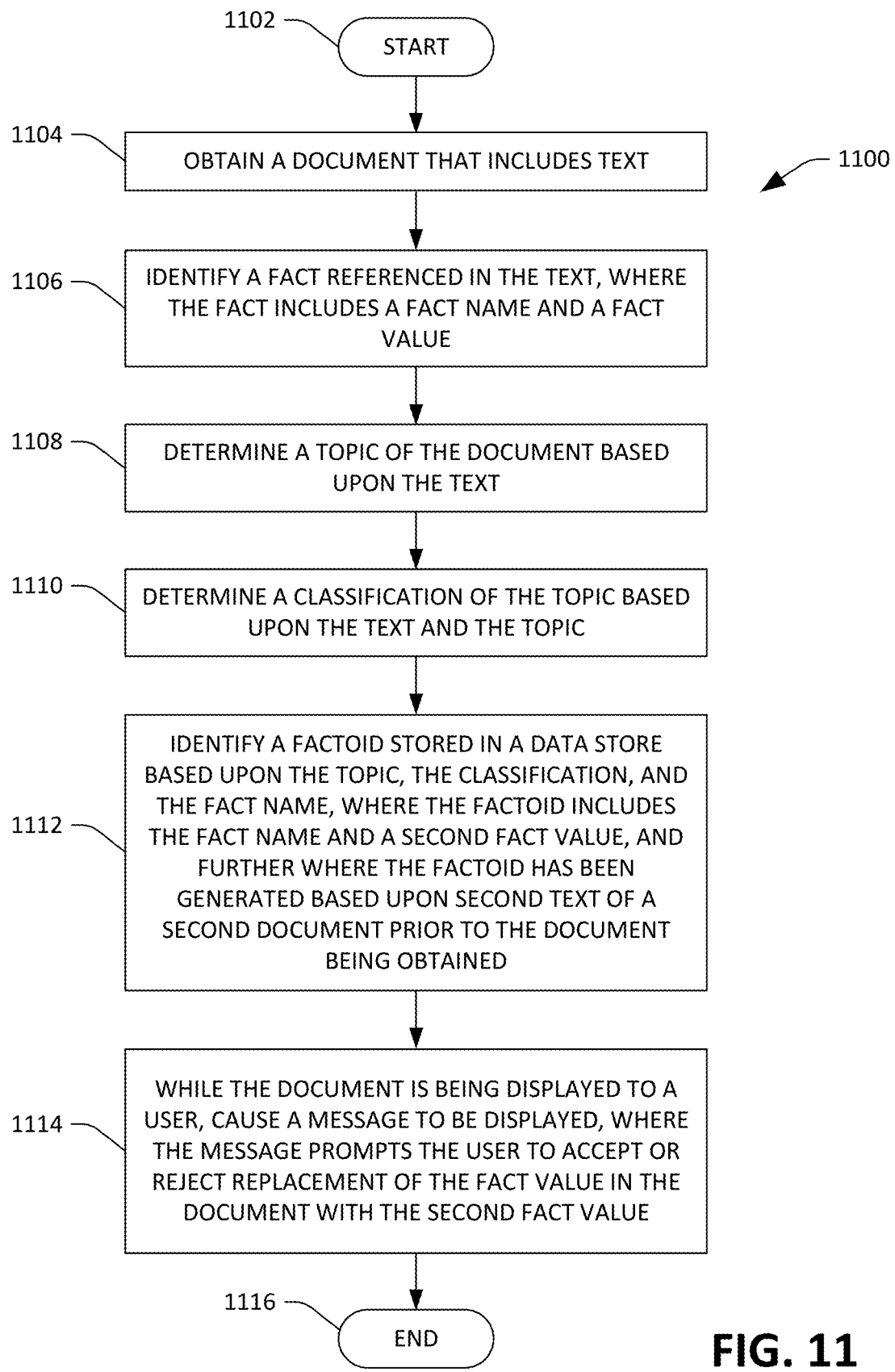
FIG. 11 is a flow diagram that illustrates an example methodology executed by a computing system on-line that facilitates detecting and updating stale information.

FIGS. 10 and 11 illustrate example methodologies relating to detecting and updating stale information. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 10, an example methodology 1000 executed by a computing system off-line that facilitates detecting and updating stale information is illustrated. The methodology 1000 begins at 1002, and at 1004, the computing system obtains a document that includes text. At 1006, the computing system identifies a fact name and a fact value referenced in the text of the document using a NLP algorithm, where the fact value corresponds to the fact name. At 1008, the computing system determines a topic of the document based upon the text of the document using a deep learning model. At 1010, the computing system determines a classification of the topic based upon the topic and the text of the document. At 1012, the computing system stores an entry for the topic and a factoid in a data store. The entry for the topic includes an identifier for the topic, the classification of the topic, and a link to the factoid. The entry for the topic may also include an identifier for the document. The factoid includes the fact name and the fact value. The factoid may also include a link to the entry for the topic and metadata for the factoid, such as a date of creation of factoid. The computing system utilizes the entry for the topic and the factoid to replace an outdated fact value in a second document with the fact value in the factoid subsequent to the entry for the topic and the factoid being stored in the data store. The methodology 1000 concludes at 1014.

Turning now to FIG. 11, an example methodology 1100 executed by a computing system on-line that facilitates detecting and updating stale information is illustrated. The methodology 1100 begins at 1102, and at 1104, the computing system obtains a document that includes text. At 1106, the computing system identifies a fact referenced in the text of the document using a NLP algorithm. The fact includes a fact name and a fact value corresponding to the fact name. At 1108, the computing system determines a topic of the document based upon the text of the document using a deep learning model. At 1110, the computing system determines a classification of the topic of the document based upon the text of the document and the topic of the document. At 1112, the computing system identifies a factoid stored in a data store based upon the topic, the classification of the topic, and the fact name. The factoid includes the fact name and a second fact value corresponding to the fact name. The factoid has been generated based upon second text of a second document prior to the document being obtained. At 1114, while the document is being displayed to a user, the computing system causes a message to be displayed to the user. The message prompts the user to accept or reject replacement of the fact value in the document with the second fact value from the factoid. The second fact value is displayed in place of the fact value upon receipt of an indication that the user accepts the replacement of the fact value in the document with the second fact value from the factoid. The methodology 1100 concludes at 1116.

Figure 12:
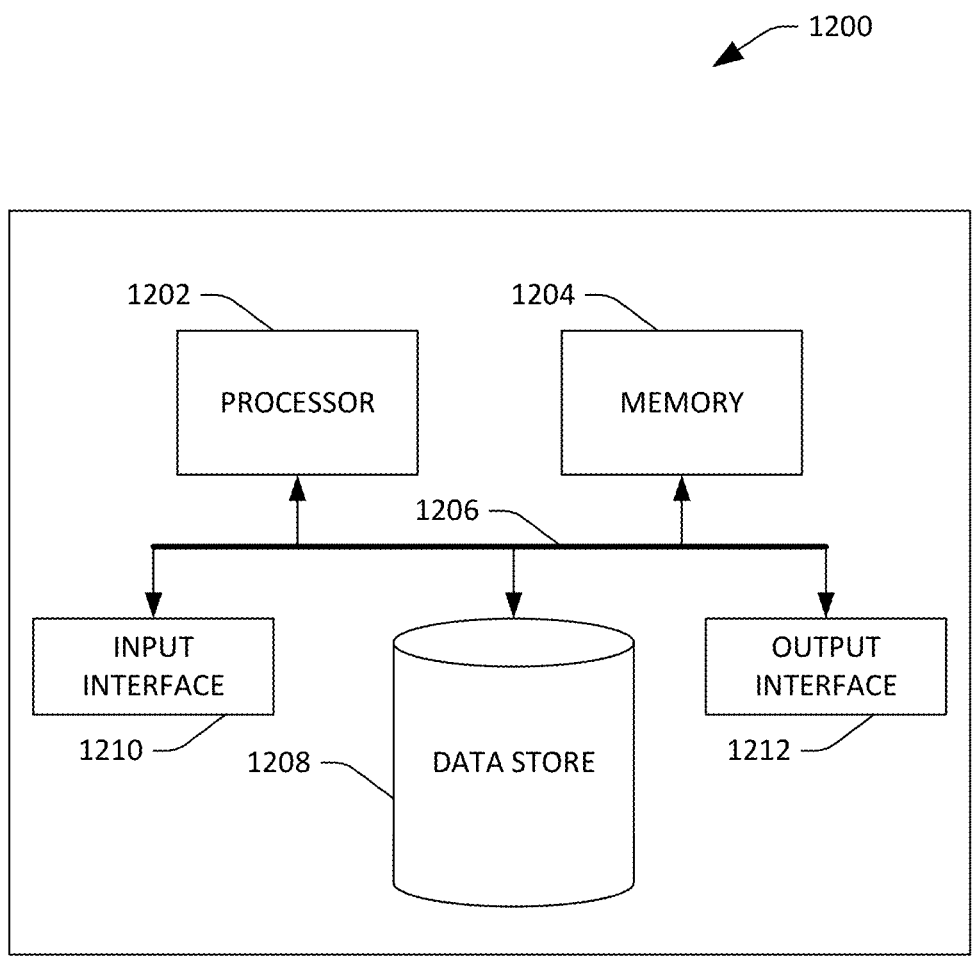
FIG. 12 illustrates an example computing device.

Referring now to FIG. 12, a high-level illustration of an example computing device 1200 that can be used in accordance with the systems and methodologies disclosed herein is illustrated. For instance, the computing device 1200 may be used in a system that detects and updates stale information in computer-readable documents. By way of another example, the computing device 1200 can be used in a system that presents a computer-readable document to a user. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store computer-implemented statistical models (e.g., machine learning models) and/or algorithms, computer-readable documents (e.g., word processing documents, spreadsheets, slideshows, real-time messages, emails, etc.), factoids, topic entries, etc.

The computing device 1200 additionally includes a data store 1208 that is accessible by the processor 1202 by way of the system bus 1206. The data store 1208 may include executable instructions, computer-implemented statistical models (e.g., machine learning models) and/or algorithms, computer-readable documents (e.g., word processing documents, spreadsheets, slideshows, real-time messages, emails, etc.), factoids, topic entries, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

The present disclosure relates to detecting and updating stale information according to at least the following examples:

(A1) In one aspect, some embodiments include a method (e.g., 1100) executed by a processor (e.g., 104) of a computing system (e.g., 102). The method includes obtaining (e.g., 1104) a document (e.g., 140) comprising text. The method further includes identifying (e.g., 1106)) a fact referenced in the text of the document using a natural language processing (NLP) algorithm, where the fact includes a fact name and a fact value corresponding to the fact name. The method additionally includes determining (e.g., 1108) a topic of the document based upon the text of the document using a deep learning model. The method also includes determining (e.g., 1110) a classification of the topic of the document based upon the text of the document and the topic of the document. The method further includes identifying (e.g., 1112) a factoid (e.g., 142, 300) stored in a data store (e.g., 108) based upon the topic, the classification of the topic, and the fact name, where the factoid includes the fact name and a second fact value corresponding to the fact name, and further where the factoid has been generated based upon second text of a second document (e.g., 146) prior to the document being obtained. The method additionally includes while the document is being displayed to a user (e.g., 118), causing (e.g., 1114) a message (e.g., 724, 806, 908) to be displayed to the user, wherein the message prompts the user to accept or reject replacement of the fact value in the document with the second fact value, wherein the second fact value is displayed in place of the fact value upon receipt of an indication that the user accepts the replacement of the fact value in the document with the second fact value.

(A2) According to some embodiments of the method of A1, the document is currently being authored by the user when the document is obtained.

(A3) According to some embodiments of any of the methods of A1-A2, the document is an email or a real-time message. The method further includes receiving the indication that the user accepts the replacement of the fact value in the email or the real-time message with the second fact value. The method additionally includes upon receiving the indication, causing the fact value in the email or the real-time message to be replaced with the second fact value such that the second fact value is displayed in place of the fact value in the email or the real-time message, where the email or the real-time message is transmitted over a network (e.g., 120) connection to an electronic account of a second user subsequent to the fact value being replaced with the second fact value.

(A4) According to some embodiments of any of the methods of A1-A3, the second fact value is not displayed in place of the fact value upon receipt of an indication that the user does not accept the replacement of the fact value in the document with the second fact value.

(A5) According to some embodiments of any of the methods of A1-A4, the method further includes subsequent to causing the message to be displayed, receiving a third fact value corresponding to the fact name. The method additionally includes replacing the second fact value in the factoid stored in the data store with the third fact value.

(A6) According to some embodiments of any of the methods of A1-A5, the second fact value corresponds to a current value for the fact name.

(B1) In another aspect, some embodiments include a computing system (e.g., 102) that includes a processor (e.g., 104) and memory (e.g., 106). The memory stores instructions that, when executed by the processor, cause the processor to perform any of the methods described herein (e.g., any of A1-A6).

(C1) In yet another aspect, some embodiments include a non-transitory computer-readable storage medium that includes instructions that, when executed by a processor (e.g., 104) of a computing system (e.g., 102), cause the processor to perform any of the methods described herein (e.g., any of A1-A6).

(D1) In another aspect, some embodiments include a method executed by a computing system (e.g., 102) that includes a processor (e.g., 104) and memory (e.g., 106). The method includes obtaining a document (e.g., 140) comprising text. The method further includes identifying a fact referenced in the text of the document using a natural language processing (NLP) algorithm, where the fact includes a fact name and a fact value corresponding to the fact name. The method additionally includes determining a topic of the document based upon the text of the document using a deep learning model. The method also includes identifying a factoid (e.g., 142, 300) stored in a data store (e.g., 108) based upon the topic and the fact name, where the factoid includes the fact name and a second fact value corresponding to the fact name, and further where the factoid has been generated based upon second text of a second document (e.g., 146) prior to the document being obtained. The method further includes while the document is being displayed to a user (e.g., 118), causing a message (e.g., 724, 806, 908) to be displayed to the user, where the message prompts the user to accept or reject replacement of the fact value in the document with the second fact value, where the second fact value is displayed in place of the fact value upon receipt of an indication that the user accepts the replacement of the fact value in the document with the second fact value.

(D2) According to some embodiments of the method of D1, the method further includes prior to obtaining the document, obtaining the second document. The method additionally includes identifying the fact name and the second fact value referenced in the second text of the second document using the NLP algorithm. The method also includes determining the topic based upon the second text of the second document using the deep learning model. The method further includes determining a classification of the topic based upon the second text of the second document and the topic. The method additionally includes storing an entry (e.g., 144) for the topic in the data store and the factoid in the data store, where the entry for the topic includes an identifier for the topic, the classification of the topic, and a link to the factoid, and where the factoid includes the fact name and the second fact value, and further where the factoid is further identified based upon the entry for the topic stored in the data store.

(D3) According to some embodiments of any of the methods of D1-D2, the fact value and the second fact value are numbers, words, or images.

(D4) According to some embodiments of any of the methods of D1-D3, the documents is one of a word processing document, a spreadsheet, a slideshow, an email, or a real-time message input by the user.

(D5) According to some embodiments of any of the methods of D1-D4, the fact name and the fact value are set forth as input to the document by the user prior to identification of the fact.

(D6) According to some embodiments of any of the methods of D1-D5, the method further includes determining a classification of the topic of the document based upon the text of the document and the topic of the document, where identifying the factoid is further based upon the classification of the topic of the document.

(D7) According to some embodiments of any of the methods of D1-D6, at least one of the NLP algorithm or the deep learning model is updated based upon receipt of the indication that the user accepts the replacement of the fact value in the document with the second fact value.

(D8) According to some embodiments of any of the methods of D1-D7, the method further includes identifying a second factoid stored in the data store based upon the topic and the fact name, where the second factoid includes the fact name and a third fact value corresponding to the fact name, and further where the second factoid has been generated based upon third text of a third document prior to the document being obtained. The method additionally includes filtering the second factoid from consideration based upon execution of a pre-defined rule over the second factoid, where the factoid is included in the message due to the second factoid being filtered from consideration.

(D9) According to some embodiments of any of the methods of D1-D8, the method further includes receiving the indication that the user accepts the replacement of the fact value in the document with the second fact value. The method additionally includes upon receiving the indication, causing the fact value in the document to be replaced with the second fact value such that the second fact value is displayed in place of the fact value.

(D10) According to some embodiments of any of the methods of D1-D9, the method further includes identifying a second factoid stored in the data store based upon the topic and the fact name, where the second factoid comprises the fact name and a third fact value corresponding to the fact name, and further where the second factoid has been generated based upon third text of a third document prior to the document being obtained. The method additionally includes assigning ranks to the factoid and the second factoid based upon ranking criteria. The method also includes selecting the factoid based upon a first rank assigned to the factoid and a second rank assigned to the second factoid, where the second fact value of the factoid is included in the message based upon the factoid being selected.

(D11) According to some embodiments of any of the methods of D1-D10, the method occurs responsive to the document being opened.

(E1) In another aspect, some embodiments include a computing system (e.g., 102) including a processor (e.g., 104) and memory (e.g., 106). The memory stores instructions that, when executed by the processor, cause the processor to perform any of the methods described herein (e.g., any of D1-D11).

(F1) In yet another aspect, some embodiments include a non-transitory computer-readable storage medium that includes instructions that, when executed by a processor (e.g., 104) of a computing system (e.g., 102), cause the processor to perform any of the methods described herein (e.g., any of D1-D11).

(G1) In another aspect, some embodiments include a method performed by a computing system (e.g., 102) that includes a processor (e.g., 104). The method includes obtaining a document (e.g., 140) comprising text. The method further includes identifying a fact referenced in the text of the document using a natural language processing (NLP) algorithm, where the fact comprises a fact name and a fact value corresponding to the fact name. The method additionally includes determining a topic of the document based upon the text of the document using a deep learning model. The method also includes identifying a factoid (e.g., 142, 300) stored in a data store (e.g., 108) based upon the topic and the fact name, where the factoid comprises the fact name and a second fact value corresponding to the fact name, and further where the factoid has been generated based upon second text of a second document (e.g., 146) prior to the document being obtained. The method further includes while the document is being displayed on a display (e.g., 132) of a computing device operated (e.g., 116) by a user (e.g., 118), causing a message (e.g., 724, 806, 908) to be presented on the display, where the message prompts the user to accept or reject replacement of the fact value in the document with the second fact value, where the second fact value is displayed in place of the fact value in the document upon receipt of an indication that the user accepts the replacement of the fact value in the document with the second fact value.

(G2) According to some embodiments of the method of G1, the fact value includes a first plurality of fact values and the second fact value includes a second plurality of fact values.

(G3) According to some embodiments of any of the methods of G1-G2, the method further includes determining a classification of the topic of the document based upon the text of the document and the topic of the document, where identifying the factoid is further based upon the classification of the topic of the document.

(H1) In another aspect, some embodiments include a computing system (e.g., 102) including a processor (e.g., 104) and memory (e.g., 106). The memory stores instructions that, when executed by the processor, cause the processor to perform any of the methods described herein (e.g., any of G1-G3).

I1) In yet another aspect, some embodiments include a non-transitory computer-readable storage medium that includes instructions that, when executed by a processor (e.g., 104) of a computing system (e.g., 102), cause the processor to perform any of the methods described herein (e.g., any of G1-G3).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
    a processor; and
    memory storing instructions that, when executed by the processor, cause the processor to perform acts comprising:
        obtaining a document comprising text;
        identifying a fact referenced in the text of the document using a natural language processing (NLP) algorithm, wherein the fact comprises a fact name and a fact value corresponding to the fact name;
        determining a topic of the document based upon the text of the document using a deep learning model,
        identifying a factoid stored in a data store based upon the topic and the fact name, wherein the factoid comprises the fact name and a second fact value corresponding to the fact name, and further wherein the factoid has been generated based upon second text of a second document prior to the document being obtained; and
        while the document is being displayed to a user, causing a message to be displayed to the user, wherein the message prompts the user to accept or reject replacement of the fact value in the document with the second fact value, wherein the second fact value is displayed in place of the fact value upon receipt of an indication that the user accepts the replacement of the fact value in the document with the second fact value.

2. The computing system of claim 1, the acts further comprising:
    prior to obtaining the document, obtaining the second document;
    identifying the fact name and the second fact value referenced in the second text of the second document using the NLP algorithm;
    determining the topic based upon the second text of the second document using the deep learning model;
    determining a classification of the topic based upon the second text of the second document and the topic; and
    storing an entry for the topic in the data store and the factoid in the data store, wherein the entry for the topic comprises an identifier for the topic, the classification of the topic, and a link to the factoid, wherein the factoid comprises the fact name and the second fact value, and further wherein the factoid is further identified based upon the entry for the topic stored in the data store.

3. The computing system of claim 1, wherein the fact value and the second fact value are:
    numbers;
    words; or
    images.

4. The computing system of claim 1, wherein the document is one of:
    a word processing document;
    a spreadsheet;
    a slideshow;
    an email; or
    a real-time message input by the user.

5. The computing system of claim 1, wherein the fact name and the fact value are set forth as input to the document by the user prior to identification of the fact.

6. The computing system of claim 1, the acts further comprising:
determining a classification of the topic of the document based upon the text of the document and the topic of the document, wherein identifying the factoid is further based upon the classification of the topic of the document.

7. The computing system of claim 1, wherein at least one of the NLP algorithm or the deep learning model is updated based upon receipt of the indication that the user accepts the replacement of the fact value in the document with the second fact value.

8. The computing system of claim 1, the acts further comprising:
identifying a second factoid stored in the data store based upon the topic and the fact name, wherein the second factoid comprises the fact name and a third fact value corresponding to the fact name, and further wherein the second factoid has been generated based upon third text of a third document prior to the document being obtained; and
filtering the second factoid from consideration based upon execution of a pre-defined rule over the second factoid, wherein the factoid is included in the message due to the second factoid being filtered from consideration.

9. The computing system of claim 1, the acts further comprising:
receiving the indication that the user accepts the replacement of the fact value in the document with the second fact value; and
upon receiving the indication, causing the fact value in the document to be replaced with the second fact value such that the second fact value is displayed in place of the fact value.

10. The computing system of claim 1, the acts further comprising:
identifying a second factoid stored in the data store based upon the topic and the fact name, wherein the second factoid comprises the fact name and a third fact value corresponding to the fact name, and further wherein the second factoid has been generated based upon third text of a third document prior to the document being obtained;
assigning ranks to the factoid and the second factoid based upon ranking criteria; and
selecting the factoid based upon a first rank assigned to the factoid and a second rank assigned to the second factoid, wherein the second fact value of the factoid is included in the message based upon the factoid being selected.

11. The computing system of claim 1, wherein the acts occur responsive to the document being opened.

12. A method executed by a processor of a computing system, the method comprising:
obtaining a document comprising text;
identifying a fact referenced in the text of the document using a natural language processing (NLP) algorithm, wherein the fact comprises a fact name and a fact value corresponding to the fact name;
determining a topic of the document based upon the text of the document using a deep learning model;
determining a classification of the topic of the document based upon the text of the document and the topic of the document;
identifying a factoid stored in a data store based upon the topic, the classification of the topic, and the fact name, wherein the factoid comprises the fact name and a second fact value corresponding to the fact name, and further wherein the factoid has been generated based upon second text of a second document prior to the document being obtained, and
while the document is being displayed to a user, causing a message to be displayed to the user, wherein the message prompts the user to accept or reject replacement of the fact value in the document with the second fact value, wherein the second fact value is displayed in place of the fact value upon receipt of an indication that the user accepts the replacement of the fact value in the document with the second fact value.

13. The method of claim 12, wherein the document is currently being authored by the user when the document is obtained.

14. The method of claim 12, wherein the document is an email or a real-time message, the method further comprising:
receiving the indication that the user accepts the replacement of the fact value in the email or the real-time message with the second fact value; and
upon receiving the indication, causing the fact value in the email or the real-time message to be replaced with the second fact value such that the second fact value is displayed in place of the fact value in the email or the real-time message, wherein the email or the real-time message is transmitted over a network connection to an electronic account of a second user subsequent to the fact value being replaced with the second fact value.

15. The method of claim 12, wherein the second fact value is not displayed in place of the fact value upon receipt of an indication that the user does not accept the replacement of the fact value in the document with the second fact value.

16. The method of claim 12, further comprising:
subsequent to causing the message to be displayed, receiving a third fact value corresponding to the fact name; and
replacing the second fact value in the factoid stored in the data store with the third fact value.

17. The method of claim 12, wherein the second fact value corresponds to a current value for the fact name.

18. A non-transitory computer-readable storage medium comprising instructions that, when executed by a processor of a computing system, cause the processor to perform acts comprising:
obtaining a document comprising text;
identifying a fact referenced in the text of the document using a natural language processing (NLP) algorithm, wherein the fact comprises a fact name and a fact value corresponding to the fact name;
determining a topic of the document based upon the text of the document using a deep learning model;
identifying a factoid stored in a data store based upon the topic and the fact name, wherein the factoid comprises the fact name and a second fact value corresponding to the fact name, and further wherein the factoid has been generated based upon second text of a second document prior to the document being obtained; and
while the document is being displayed on a display of a computing device operated by a user, causing a message to be presented on the display, wherein the message prompts the user to accept or reject replacement of the fact value in the document with the second fact value, wherein the second fact value is displayed in place of the fact value in the document upon receipt of an indication that the user accepts the replacement of the fact value in the document with the second fact value.

19. The non-transitory computer-readable storage medium of claim 18, wherein the fact value comprises a first plurality of fact values, wherein the second fact value comprises a second plurality of fact values.

20. The non-transitory computer-readable storage medium of claim 18, the acts further comprising:
    determining a classification of the topic of the document based upon the text of the document and the topic of the document, wherein identifying the factoid is further based upon the classification of the topic of the document.

* * * * *